United States Patent
Chae et al.

(10) Patent No.: US 11,191,047 B2
(45) Date of Patent: Nov. 30, 2021

(54) METHOD AND APPARATUS FOR ALLOWING USER EQUIPMENT TO TRANSMIT AND RECEIVE SYNCHRONIZATION SIGNAL IN PLURALITY OF COMPONENT CARRIERS IN WIRELESS COMMUNICATION SYSTEM

(71) Applicant: LG ELECTRONICS INC., Seoul (KR)

(72) Inventors: Hyukjin Chae, Seoul (KR); Seungmin Lee, Seoul (KR); Hanbyul Seo, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 64 days.

(21) Appl. No.: 16/652,018

(22) PCT Filed: Sep. 28, 2018

(86) PCT No.: PCT/KR2018/011563
§ 371 (c)(1),
(2) Date: Mar. 27, 2020

(87) PCT Pub. No.: WO2019/066576
PCT Pub. Date: Apr. 4, 2019

(65) Prior Publication Data
US 2020/0267671 A1    Aug. 20, 2020

Related U.S. Application Data

(60) Provisional application No. 62/565,090, filed on Sep. 28, 2017, provisional application No. 62/566,298, (Continued)

(30) Foreign Application Priority Data

Apr. 6, 2018 (KR) .................. 10-2018-0040567

(51) Int. Cl.
*H04W 56/00* (2009.01)
*H04L 5/00* (2006.01)

(52) U.S. Cl.
CPC .......... *H04W 56/001* (2013.01); *H04L 5/001* (2013.01)

(58) Field of Classification Search
CPC ............ H04W 56/00; H04W 56/0005; H04W 56/002; H04W 56/0015; H04W 56/001;
(Continued)

(56) References Cited

U.S. PATENT DOCUMENTS

2012/0120821 A1    5/2012  Kazmi et al.
2017/0353936 A1*  12/2017  Zhang ................ H04W 56/001
2018/0199388 A1*   7/2018  Tabet ................ H04W 72/0446

FOREIGN PATENT DOCUMENTS

CN    105992348    10/2016
CN    106304257     1/2017
(Continued)

OTHER PUBLICATIONS

PCT International Application No. PCT/KR2018/011563, Written Opinion of the International Searching Authority dated Jan. 2, 2019, 21 pages.
(Continued)

*Primary Examiner* — Kyaw Z Soe
(74) *Attorney, Agent, or Firm* — Lee, Hong, Degerman, Kang & Waimey PC

(57) ABSTRACT

One embodiment of the present invention relates to a method for transmitting a sidelink synchronization signal (SLSS) in a wireless communication system, comprising the steps of: selecting, by user equipment (UE), a synchronization reference from among a plurality of synchronization sources; and transmitting the SLSS on the basis of the selected synchronization reference, wherein the synchroni-
(Continued)

S1401 — Select Synchronization Reference from among Plural Synchronization Sources S1402 — Transmit SLSS Based on Selected Synchronization Reference zation reference is selected from among synchronization sources in two or more component carriers (CCs).

14 Claims, 14 Drawing Sheets

Related U.S. Application Data filed on Sep. 29, 2017, provisional application No. 62/570,088, filed on Oct. 9, 2017, provisional application No. 62/586,879, filed on Nov. 15, 2017, provisional application No. 62/591,182, filed on Nov. 27, 2017, provisional application No. 62/630,776, filed on Feb. 14, 2018, provisional application No. 62/635,527, filed on Feb. 26, 2018.

(58) Field of Classification Search
CPC .. H04W 56/0025; H04W 92/18; H04L 5/001; H04L 5/00
See application file for complete search history.

(56) References Cited

FOREIGN PATENT DOCUMENTS

| CN | 106576354 | 4/2017 |
|---|---|---|
| CN | 106605435 | 4/2017 |
| WO | 2016163708 | 10/2016 |
| WO | 2017123047 | 7/2017 |

OTHER PUBLICATIONS

LG Electronics, "Discussion on synchronization for sidelink CA", 3GPP TSG RAN WG1 Meeting #90, R1-1713088, Aug. 2017, 3 pages.
Intel, "Sidelink Synchronization Enhancements for Wearable and IoT Use Cases", 3GPP TSG RAN WG1 Meeting #89, R1-1707330, May 2017, 5 pages.
Intel, "Sidelink carrier aggregation for LTE V2V communication", 3GPP TSG RAN WG1 Meeting #89, R1-1707300, May 2017, 8 pages.
Huawei, et al., "Discussion on synchronization support for carrier aggregation of R15 sidelink", 3GPP TSG RAN WG1 Meeting #90, R1-1712131, Aug. 2017, 3 pages.
Intellectual Property Office of India Application Serial No. 202027015941, Office Action dated May 13, 2021, 5 page.
The State Intellectual Property Office of the People's Republic of China Application Serial No. 201880063322.7, Office Action dated Jul. 1, 2021, 8 pages.
Japan Patent Office Application No. 2020-518520, Office Action dated Jun. 29, 2021, 4 pages.
LG Electronics et al., "WF on synchronization in sidelink CA," R1-1709507, 3GPP TSG RAN WG1 Meeting #89, May 2017, 3 pages.
Ericsson, "Further discussions on handling timing mismatch between GNSS and WAN timing references," R1-1701548, 3GPP TSG RAN WG4 Meeting #82, Feb. 2017, 6 pages.
Huawei et al., "Sidelink Synchronization Issues," R2-167938, 3GPP TSG RAN WG2 Meeting #96, Nov. 2016, 5 pages.
European Patent Office Application Serial No. 18860892.1, Search Report dated Oct. 22, 2020, 13 pages.
ZTE, "Synchronization in sidelink CA," 3GPP TSG RAN WG1 Meeting #90, R1-1712925, Aug. 2017, 4 pages.
Korean Intellectual Property Office Application No. 10-2020-7012400, Office Action dated Mar. 8, 2012.
3rd Generation Partnership Project, "Technical Specification Group Radio Access Network; Evolved Universal Terrestrial Radio Access (E-UTRA); Radio Resource Control (RRC); Protocol specification (Release 12)," 3GPP TS 36.331 V12.15.0, Sep. 2017, 460 pages.

* cited by examiner (a)

(b)

(a)

(b)

(a)

(b)

METHOD AND APPARATUS FOR ALLOWING USER EQUIPMENT TO TRANSMIT AND RECEIVE SYNCHRONIZATION SIGNAL IN PLURALITY OF COMPONENT CARRIERS IN WIRELESS COMMUNICATION SYSTEM

CROSS-REFERENCE TO RELATED APPLICATIONS

This application is the National Stage filing under 35 U.S.C. 371 of International Application No. PCT/KR2018/011563, filed on Sep. 28, 2018, which claims the benefit of U.S. Provisional Application Nos. 62/565,090, filed on Sep. 28, 2017, 62/566,298, filed on Sep. 29, 2017, 62/570,088, filed on Oct. 9, 2017, 62/586,879, filed on Nov. 15, 2017, 62/591,182, filed on Nov. 27, 2017, 62/630,776, filed on Feb. 14, 2018, and 62/635,527, filed on Feb. 26, 2018, and also claims the benefit of earlier filing date and right of priority to Korean Application No. 10-2018-0040567, filed on Apr. 6, 2018, the contents of which are all hereby incorporated by reference herein in their entirety.

TECHNICAL FIELD

The present disclosure relates to a wireless communication system, and more particularly, to a method of selecting a synchronization reference related to a sidelink synchronization signal (SLSS) and a method and apparatus for transmitting and receiving an SLSS based on the method.

BACKGROUND ART

Wireless communication systems have been widely deployed to provide various types of communication services such as voice or data. In general, a wireless communication system is a multiple access system that supports communication of multiple users by sharing available system resources (a bandwidth, transmission power, etc.) among them. For example, multiple access systems include a code division multiple access (CDMA) system, a frequency division multiple access (FDMA) system, a time division multiple access (TDMA) system, an orthogonal frequency division multiple access (OFDMA) system, a single carrier frequency division multiple access (SC-FDMA) system, and a multi-carrier frequency division multiple access (MC-FDMA) system.

Device-to-device (D2D) communication is a communication scheme in which a direct link is established between user equipments (UEs) and the UEs exchange voice and data directly without intervention of an evolved Node B (eNB). D2D communication may cover UE-to-UE communication and peer-to-peer communication. In addition, D2D communication may be applied to machine-to-machine (M2M) communication and machine type communication (MTC).

D2D communication is under consideration as a solution to the overhead of an eNB caused by rapidly increasing data traffic. For example, since devices exchange data directly with each other without intervention of an eNB by D2D communication, compared to legacy wireless communication, network overhead may be reduced. Further, it is expected that the introduction of D2D communication will reduce procedures of an eNB, reduce the power consumption of devices participating in D2D communication, increase data transmission rates, increase the accommodation capability of a network, distribute load, and extend cell coverage.

At present, vehicle-to-everything (V2X) communication in conjunction with D2D communication is under consideration. In concept, V2X communication covers vehicle-to-vehicle (V2V) communication, vehicle-to-pedestrian (V2P) communication for communication between a vehicle and a different kind of terminal, and vehicle-to-infrastructure (V2I) communication for communication between a vehicle and a roadside unit (RSU).

DISCLOSURE

Technical Problem

An aspect of the present disclosure is to provide a method and/or apparatus for effectively acquiring synchronization between user equipments (UEs), when a UE transmits and receives a sidelink signal in a plurality of component carriers (CCs).

It will be appreciated by persons skilled in the art that the objects that could be achieved with the present disclosure are not limited to what has been particularly described hereinabove and the above and other objects that the present disclosure could achieve will be more clearly understood from the following detailed description.

Technical Solution

According to an embodiment of the present disclosure, a method of transmitting a sidelink synchronization signal (SLSS) in a wireless communication system includes selecting a synchronization reference from among a plurality of synchronization sources by a user equipment (UE), and transmitting an SLSS based on the selected synchronization reference. The synchronization reference is selected from among synchronization sources in two or more component carriers (CCs).

According to an embodiment of the present disclosure, a UE for transmitting an SLSS in a wireless communication system includes a transmitter and receiver, and a processor. The processor is configured to select a synchronization reference from among a plurality of synchronization sources, and transmit an SLSS based on the selected synchronization reference through the transmitter. The synchronization reference is selected from among synchronization sources in two or more component carriers (CCs).

The plurality of synchronization sources may be monitored in the two or more CCs.

The UE may transmit the SLSS only in a CC from which the synchronization reference is selected.

The UE may transmit the SLSS in all CCs related to the plurality of synchronization sources.

The UE may transmit the SLSS in all CCs in which an SLSS (or the SLSS?) is monitored.

Whether the UE is to transmit the SLSS only in the CC in which the synchronization reference is selected or in all CCs related to the plurality of synchronization sources may be configured by higher-layer signaling.

The UE may align synchronization between the two or more CCs based on the selected synchronization reference.

A CC from which the synchronization reference is selected may be determined as a synchronization reference CC.

The synchronization reference may be selected based on priority.

When two or more synchronization sources have the same priority, a synchronization source having a large signal strength may be selected during the selection of the synchronization reference.

A CC in which the SLSS is to be transmitted may be indicated by higher-layer signaling.

When the SLSS is transmitted in the two or more CCs, the SLSS may be transmitted sequentially in the respective CCs.

When the SLSS is transmitted in the two or more CCs, a transmission period of the SLSS may be longer than when the SLSS is transmitted in one CC.

The plurality of synchronization sources may include a global navigation satellite system (GNSS) and an evolved Node B (eNB).

Advantageous Effects

According to the present disclosure, when a signal is transmitted and received in a plurality of component carriers (CCs), each of the CCs is synchronized with a highest-priority synchronization reference. Therefore, power may be used efficiently.

It will be appreciated by persons skilled in the art that the effects that may be achieved with the present disclosure are not limited to what has been particularly described hereinabove and other advantages of the present disclosure will be more clearly understood from the following detailed description taken in conjunction with the accompanying drawings.

BRIEF DESCRIPTION OF THE DRAWINGS

The accompanying drawings, which are included to provide a further understanding of the present disclosure and are incorporated in and constitute a part of this application, illustrate embodiments of the present disclosure and together with the description serve to explain the principle of the present disclosure. In the drawings.

BEST MODE

Figure 1:
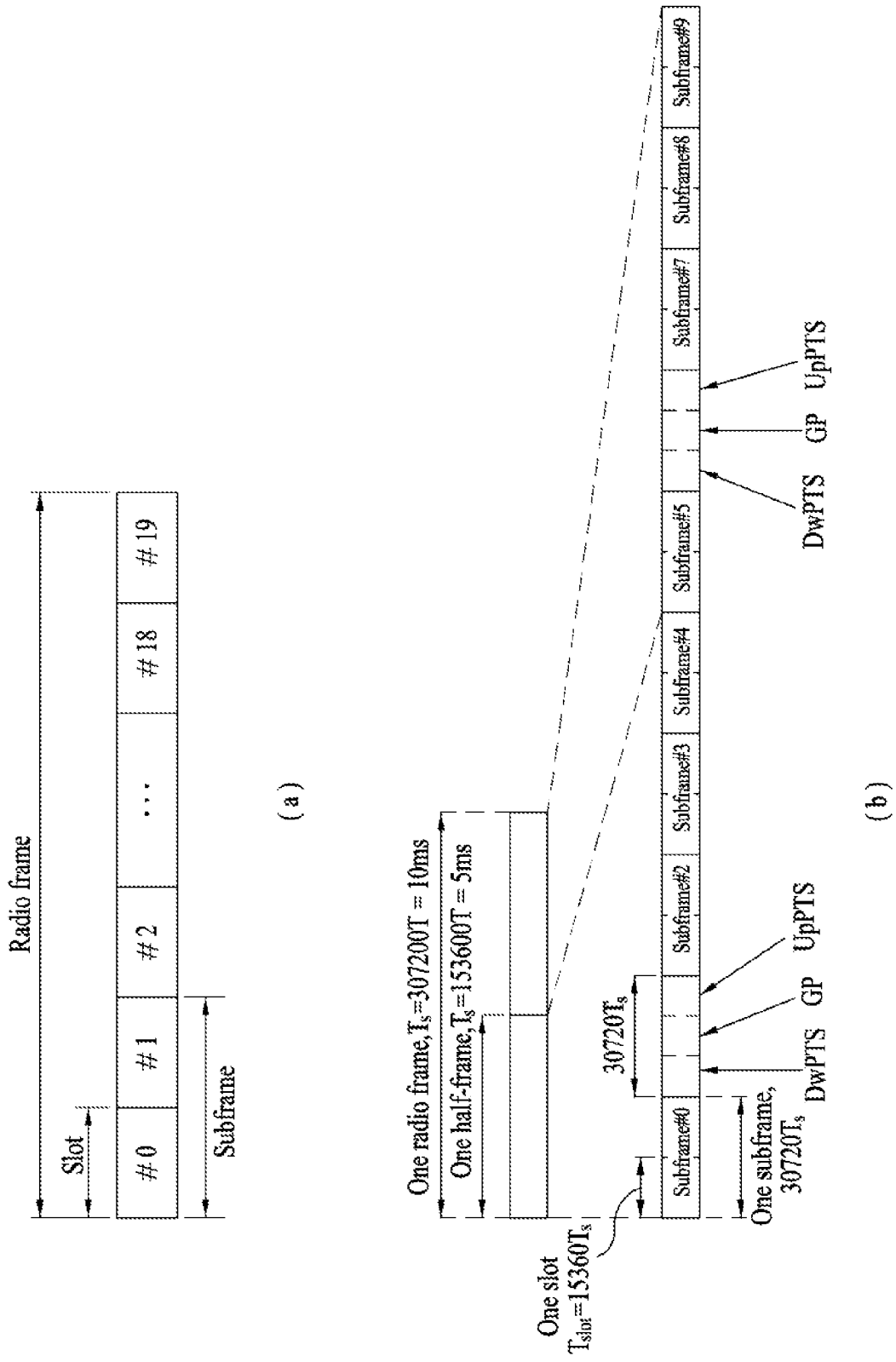
FIG. 1 is a view illustrating the structure of a radio frame.

The embodiments of the present disclosure described hereinbelow are combinations of elements and features of the present disclosure. The elements or features may be considered selective unless otherwise mentioned. Each element or feature may be practiced without being combined with other elements or features. Further, an embodiment of the present disclosure may be constructed by combining parts of the elements and/or features. Operation orders described in embodiments of the present disclosure may be rearranged. Some constructions or features of any one embodiment may be included in another embodiment and may be replaced with corresponding constructions or features of another embodiment.

In the embodiments of the present disclosure, a description is made, centering on a data transmission and reception relationship between a base station (BS) and a user equipment (UE). The BS is a terminal node of a network, which communicates directly with a UE. In some cases, a specific operation described as performed by the BS may be performed by an upper node of the BS.

Namely, it is apparent that, in a network comprised of a plurality of network nodes including a BS, various operations performed for communication with a UE may be performed by the BS or network nodes other than the BS. The term 'BS' may be replaced with the term 'fixed station', 'Node B', 'evolved Node B (eNode B or eNB)', 'gNodeB (gNB; next generation NodeB)' 'Access Point (AP)', etc. The term 'relay' may be replaced with the term 'relay node (RN)' or 'relay station (RS)'. The term 'terminal' may be replaced with the term 'UE', 'mobile station (MS)', 'mobile subscriber station (MSS)', 'subscriber station (SS)', etc.

The term "cell", as used herein, may be applied to transmission and reception points such as a base station (eNB), a sector, a remote radio head (RRH), and a relay, and may also be extensively used by a specific transmission/reception point to distinguish between component carriers.

Specific terms used for the embodiments of the present disclosure are provided to help the understanding of the present disclosure. These specific terms may be replaced with other terms within the scope and spirit of the present disclosure.

In some cases, to prevent the concept of the present disclosure from being ambiguous, structures and apparatuses of the known art will be omitted, or will be shown in the form of a block diagram based on main functions of each structure and apparatus. Also, wherever possible, the same reference numbers will be used throughout the drawings and the specification to refer to the same or like parts.

The embodiments of the present disclosure may be supported by standard documents disclosed for at least one of wireless access systems, Institute of Electrical and Electronics Engineers (IEEE) 802, 3rd Generation Partnership Project (3GPP), 3GPP long term evolution (3GPP LTE), LTE-advanced (LTE-A), and 3GPP2. Steps or parts that are not described to clarify the technical features of the present disclosure may be supported by those documents. Further, all terms as set forth herein may be explained by the standard documents.

Techniques described herein may be used in various wireless access systems such as code division multiple access (CDMA), frequency division multiple access (FDMA), time division multiple access (TDMA), orthogonal frequency division multiple access (OFDMA), single carrier-frequency division multiple access (SC-FDMA), etc. CDMA may be implemented as a radio technology such as universal terrestrial radio access (UTRA) or CDMA2000. TDMA may be implemented as a radio technology such as global system for mobile communications (GSM)/general packet radio service (GPRS)/Enhanced Data Rates for GSM Evolution (EDGE). OFDMA may be implemented as a radio technology such as IEEE 802.11 (Wi-Fi), IEEE 802.16 (WiMAX), IEEE 802.20, evolved-UTRA (E-UTRA) etc. UTRA is a part of universal mobile telecommunications system (UMTS). 3GPP LTE is a part of Evolved UMTS (E-UMTS) using E-UTRA. 3GPP LTE employs OFDMA for downlink and SC-FDMA for uplink. LTE-A is an evolution of 3GPP LTE. WiMAX may be described by the IEEE 802.16e standard (wireless metropolitan area network (WirelessMAN)-OFDMA Reference System) and the IEEE 802.16m standard (WirelessMAN-OFDMA Advanced System). For clarity, this application focuses on the 3GPP LTE and LTE-A systems. However, the technical features of the present disclosure are not limited thereto.

LTE/LTE-A Resource Structure/Channel

With reference to FIG. 1, the structure of a radio frame will be described below.

In a cellular orthogonal frequency division multiplexing (OFDM) wireless packet communication system, uplink and/or downlink data packets are transmitted in subframes. One subframe is defined as a predetermined time period including a plurality of OFDM symbols. The 3GPP LTE standard supports a type-1 radio frame structure applicable to frequency division duplex (FDD) and a type-2 radio frame structure applicable to time division duplex (TDD).

FIG. 1(a) illustrates the type-1 radio frame structure. A downlink radio frame is divided into 10 subframes. Each subframe is further divided into two slots in the time domain. A unit time during which one subframe is transmitted is defined as a transmission time interval (TTI). For example, one subframe may be 1 ms in duration and one slot may be 0.5 ms in duration. A slot includes a plurality of OFDM symbols in the time domain and a plurality of resource blocks (RBs) in the frequency domain. Because the 3GPP LTE system adopts OFDMA for downlink, an OFDM symbol represents one symbol period. An OFDM symbol may be referred to as an SC-FDMA symbol or symbol period. An RB is a resource allocation unit including a plurality of contiguous subcarriers in a slot.

The number of OFDM symbols in one slot may vary depending on a cyclic prefix (CP) configuration. There are two types of CPs: extended CP and normal CP. In the case of the normal CP, one slot includes 7 OFDM symbols. In the case of the extended CP, the length of one OFDM symbol is increased and thus the number of OFDM symbols in a slot is smaller than in the case of the normal CP. Thus when the extended CP is used, for example, 6 OFDM symbols may be included in one slot. If channel state gets poor, for example, during fast movement of a UE, the extended CP may be used to further decrease inter-symbol interference (ISI).

In the case of the normal CP, one subframe includes 14 OFDM symbols because one slot includes 7 OFDM symbols. The first two or three OFDM symbols of each subframe may be allocated to a physical downlink control channel (PDCCH) and the other OFDM symbols may be allocated to a physical downlink shared channel (PDSCH).

FIG. 1(b) illustrates the type-2 radio frame structure. A type-2 radio frame includes two half frames, each having 5 subframes, a downlink pilot time slot (DwPTS), a guard period (GP), and an uplink pilot time slot (UpPTS). Each subframe is divided into two slots. The DwPTS is used for initial cell search, synchronization, or channel estimation at a UE. The UpPTS is used for channel estimation and acquisition of uplink transmission synchronization to a UE at an eNB. The GP is a period between an uplink and a downlink, which eliminates uplink interference caused by multipath delay of a downlink signal. One subframe includes two slots irrespective of the type of a radio frame.

The above-described radio frame structures are purely exemplary and thus it is to be noted that the number of subframes in a radio frame, the number of slots in a subframe, or the number of symbols in a slot may vary.

Figure 2:
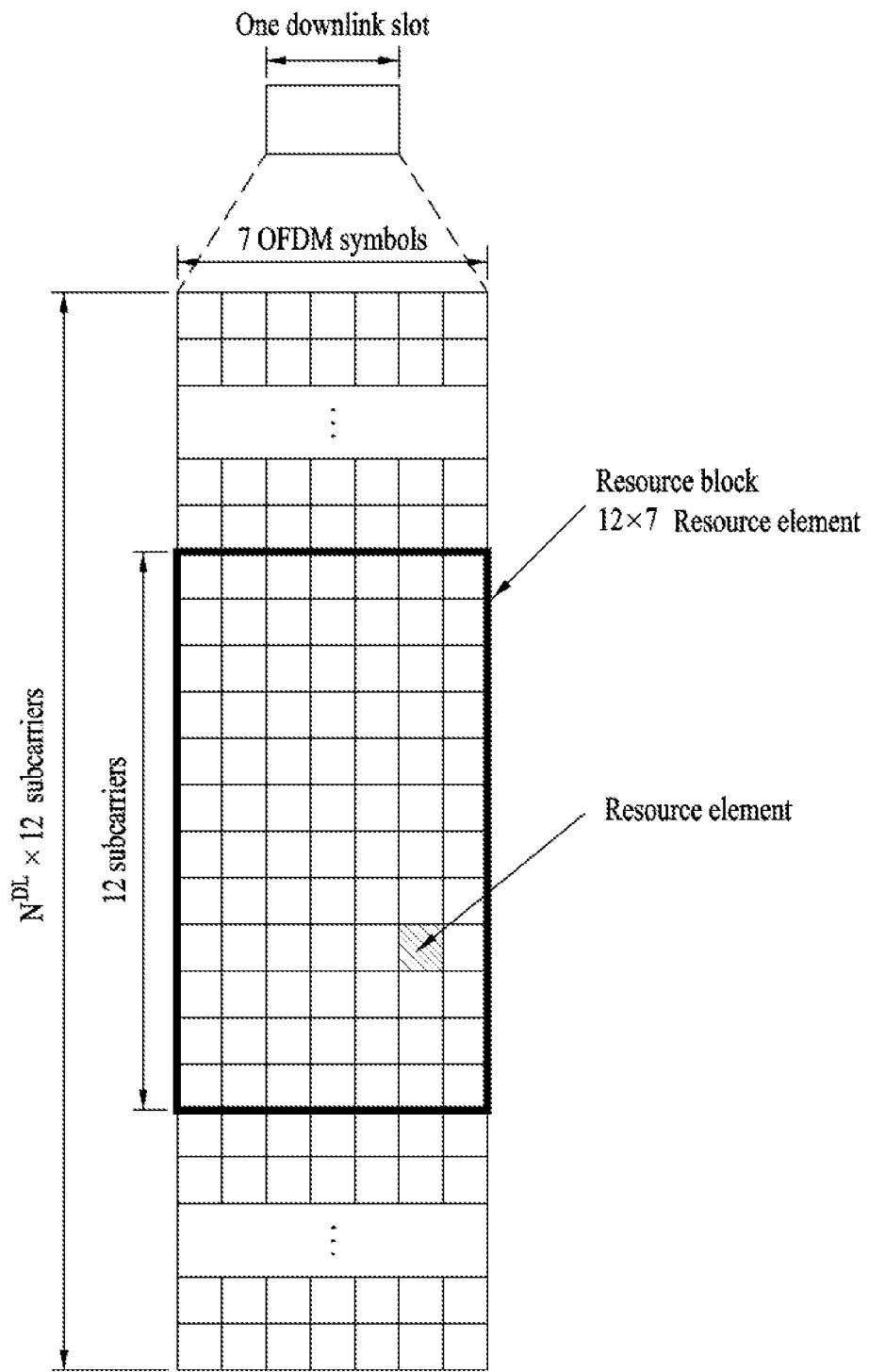
FIG. 2 is a view illustrating a resource grid during the duration of one downlink (DL) slot.

FIG. 2 illustrates the structure of a downlink resource grid for the duration of one downlink slot. A downlink slot includes 7 OFDM symbols in the time domain and an RB includes 12 subcarriers in the frequency domain, which does not limit the scope and spirit of the present disclosure. For example, a downlink slot may include 7 OFDM symbols in the case of the normal CP, whereas a downlink slot may include 6 OFDM symbols in the case of the extended CP. Each element of the resource grid is referred to as a resource element (RE). An RB includes 12×7 REs. The number of RBs in a downlink slot, NDL depends on a downlink transmission bandwidth. An uplink slot may have the same structure as a downlink slot.

Figure 3:
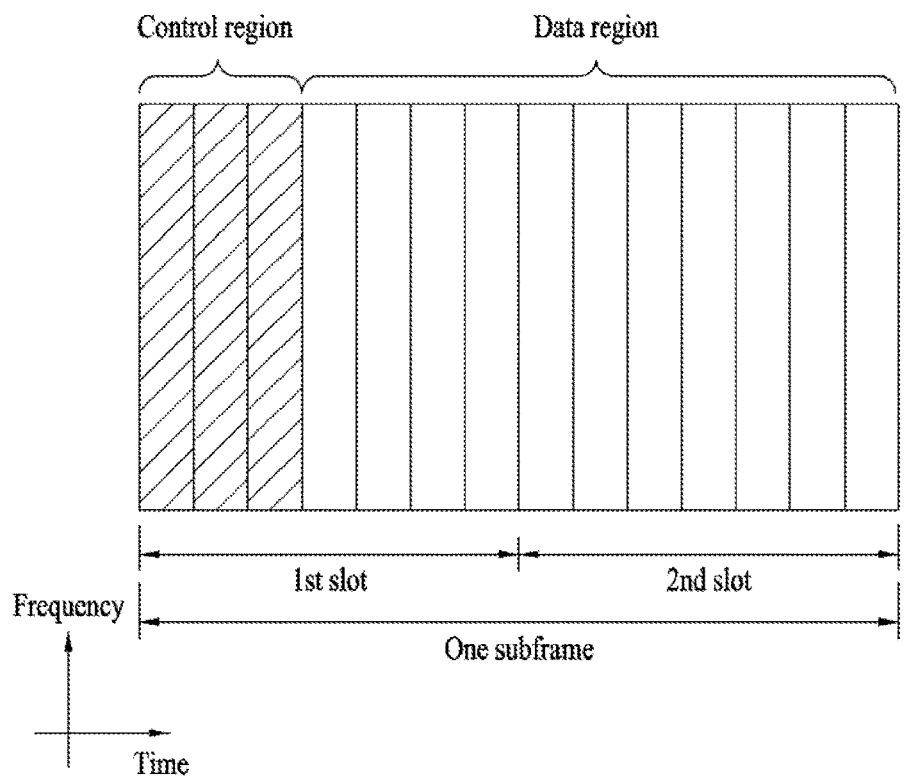
FIG. 3 is a view illustrating the structure of a DL subframe.

FIG. 3 illustrates the structure of a downlink subframe. Up to three OFDM symbols at the start of the first slot in a downlink subframe are used for a control region to which control channels are allocated and the other OFDM symbols of the downlink subframe are used for a data region to which a PDSCH is allocated. Downlink control channels used in the 3GPP LTE system include a physical control format indicator channel (PCFICH), a physical downlink control channel (PDCCH), and a physical hybrid automatic repeat request (HARQ) indicator channel (PHICH). The PCFICH is located in the first OFDM symbol of a subframe, carrying information about the number of OFDM symbols used for transmission of control channels in the subframe. The PHICH delivers an HARQ acknowledgment/negative acknowledgment (ACK/NACK) signal in response to an uplink transmission. Control information carried on the PDCCH is called downlink control information (DCI). The DCI transports uplink or downlink scheduling information, or uplink transmission power control commands for UE groups. The PDCCH delivers information about resource allocation and a transport format for a downlink shared channel (DL-SCH), resource allocation information about an uplink shared channel (UL-SCH), paging information of a paging channel (PCH), system information on the DL-SCH, information about resource allocation for a higher-layer control message such as a Random Access Response transmitted on the PDSCH, a set of transmission power control commands for individual UEs of a UE group, transmission power control information, voice over Internet protocol (VoIP) activation information, etc. A plurality of PDCCHs may be transmitted in the control region. A UE may monitor a plurality of PDCCHs. A PDCCH is formed by aggregating one or more consecutive control channel elements (CCEs). A CCE is a logical allocation unit used to provide a PDCCH at a coding rate based on the state of a radio channel. A CCE includes a plurality of RE groups. The format of a PDCCH and the number of available bits for the PDCCH are determined according to the correlation between the number of CCEs and a coding rate provided by the CCEs. An eNB determines the PDCCH format according to DCI transmitted to a UE and adds a cyclic redundancy check (CRC) to control information. The CRC is masked by an identifier (ID) known as a radio network temporary identifier (RNTI) according to the owner or usage of the PDCCH. If the PDCCH is directed to a specific UE, its CRC may be masked by a cell-RNTI (C-RNTI) of the UE. If the PDCCH is for a paging message, the CRC of the PDCCH may be masked by a paging indicator Identifier (P-RNTI). If the PDCCH carries system information, particularly, a system information block (SIB), its CRC may be masked by a system information ID and a system information RNTI (SI-RNTI). To indicate that the PDCCH carries a random access response in response to a random access preamble transmitted by a UE, its CRC may be masked by a random access-RNTI (RA-RNTI).

Figure 4:
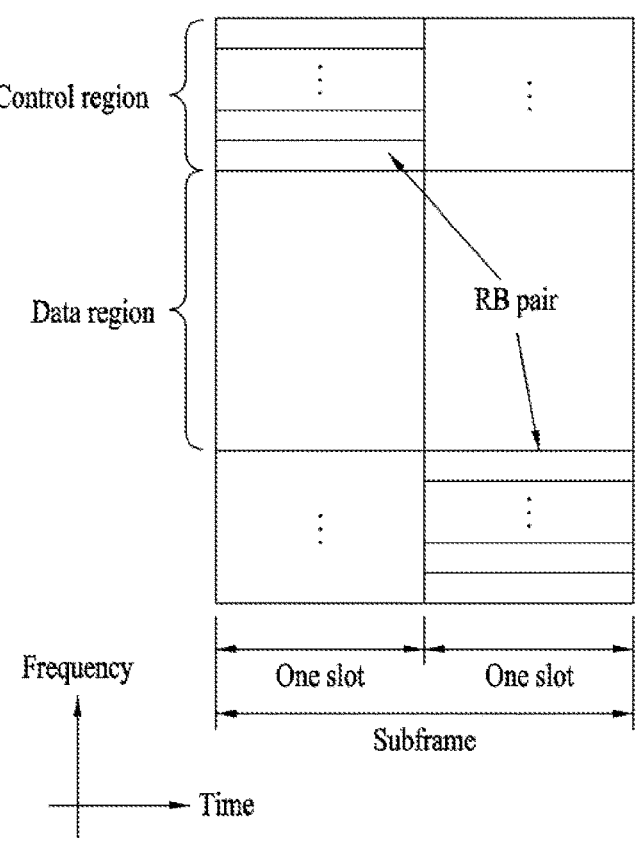
FIG. 4 is a view illustrating the structure of an uplink (UL) subframe.

FIG. 4 illustrates the structure of an uplink subframe. An uplink subframe may be divided into a control region and a data region in the frequency domain. A physical uplink control channel (PUCCH) carrying uplink control information is allocated to the control region and a physical uplink shared channel (PUSCH) carrying user data is allocated to the data region. To maintain the property of a single carrier, a UE does not transmit a PUSCH and a PUCCH simultaneously. A PUCCH for a UE is allocated to an RB pair in a subframe. The RBs of the RB pair occupy different subcarriers in two slots. Thus it is said that the RB pair allocated to the PUCCH is frequency-hopped over a slot boundary.

Reference Signal (RS)

In a wireless communication system, a packet is transmitted on a radio channel. In view of the nature of the radio channel, the packet may be distorted during the transmission. To receive the signal successfully, a receiver should compensate for the distortion of the received signal using channel information. Generally, to enable the receiver to acquire the channel information, a transmitter transmits a signal known to both the transmitter and the receiver and the receiver acquires knowledge of channel information based on the distortion of the signal received on the radio channel. This signal is called a pilot signal or an RS.

In the case of data transmission and reception through multiple antennas, knowledge of channel states between transmission (Tx) antennas and reception (Rx) antennas is required for successful signal reception. Accordingly, an RS should be transmitted through each Tx antenna.

RSs may be divided into downlink RSs and uplink RSs. In the current LTE system, the uplink RSs include:

i) Demodulation-reference signal (DM-RS) used for channel estimation for coherent demodulation of information delivered on a PUSCH and a PUCCH; and ii) Sounding reference signal (SRS) used for an eNB or a network to measure the quality of an uplink channel in a different frequency.

The downlink RSs are categorized into:

i) Cell-specific reference signal (CRS) shared among all UEs of a cell;

ii) UE-specific RS dedicated to a specific UE;

iii) DM-RS used for coherent demodulation of a PDSCH, when the PDSCH is transmitted;

iv) Channel state information-reference signal (CSI-RS) carrying CSI, when downlink DM-RSs are transmitted;

v) Multimedia broadcast single frequency network (MBSFN) RS used for coherent demodulation of a signal transmitted in MBSFN mode; and vi) Positioning RS used to estimate geographical position information about a UE.

RSs may also be divided into two types according to their purposes: RS for channel information acquisition and RS for data demodulation. Since its purpose lies in that a UE acquires downlink channel information, the former should be transmitted in a broad band and received even by a UE that does not receive downlink data in a specific subframe. This RS is also used in a situation like handover. The latter is an RS that an eNB transmits along with downlink data in specific resources. A UE may demodulate the data by measuring a channel using the RS. This RS should be transmitted in a data transmission area.

Modeling of MIMO System

Figure 5:
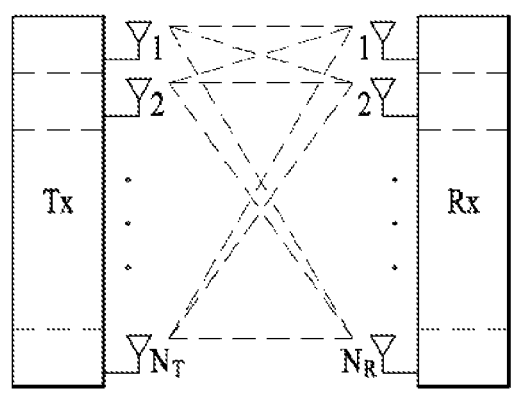
FIG. 5 is a view illustrating the configuration of a wireless communication system having multiple antennas.
Figure 5:
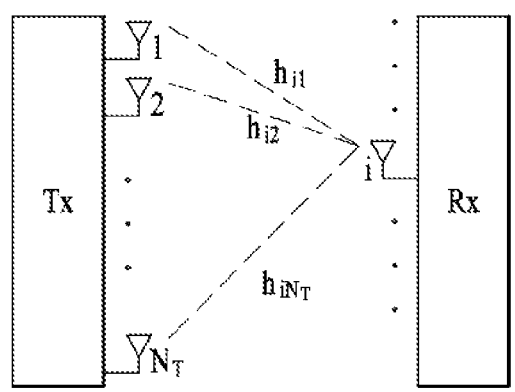

FIG. 5 is a diagram illustrating a configuration of a wireless communication system having multiple antennas.

As shown in FIG. 5(a), if the number of Tx antennas is increased to $N_T$ and the number of Rx antennas is increased to $N_R$, a theoretical channel transmission capacity is increased in proportion to the number of antennas, unlike the case where a plurality of antennas is used in only a transmitter or a receiver. Accordingly, it is possible to improve a transfer rate and to remarkably improve frequency efficiency. As the channel transmission capacity is increased, the transfer rate may be theoretically increased by a product of a maximum transfer rate Ro upon utilization of a single antenna and a rate increase ratio Ri.

$$R_i = \min(N_T, N_R) \qquad \text{[Equation 1]}$$

For instance, in an MIMO communication system, which uses four Tx antennas and four Rx antennas, a transmission rate four times higher than that of a single antenna system may be obtained. Since this theoretical capacity increase of the MIMO system has been proved in the middle of 1990s, many ongoing efforts are made to various techniques to substantially improve a data transmission rate. In addition, these techniques are already adopted in part as standards for various wireless communications such as 3G mobile communication, next generation wireless LAN, and the like.

The trends for the MIMO relevant studies are explained as follows. First of all, many ongoing efforts are made in various aspects to develop and research information theory study relevant to MIMO communication capacity calculations and the like in various channel configurations and multiple access environments, radio channel measurement and model derivation study for MIMO systems, spatiotemporal signal processing technique study for transmission reliability enhancement and transmission rate improvement and the like.

In order to explain a communicating method in an MIMO system in detail, mathematical modeling may be represented as follows. It is assumed that there are $N_T$ Tx antennas and $N_R$ Rx antennas.

Regarding a transmitted signal, if there are $N_T$ Tx antennas, the maximum number of pieces of information that may be transmitted is $N_T$. Hence, the transmission information may be represented as shown in Equation 2.

$$s = [s_1, s_2, \ldots, s_{N_T}]^T \qquad \text{[Equation 2]}$$

Meanwhile, transmit powers may be set different from each other for individual pieces of transmission information $s_1, s_2, \ldots, s_{N_T}$, respectively. If the transmit powers are set to $P_1, P_2, \ldots, P_{N_T}$, respectively, the transmission information with adjusted transmit powers may be represented as Equation 3.

$$\hat{s} = [\hat{s}_1, \hat{s}_2, \ldots, \hat{s}_{N_T}]^T = [P_1 s_1, P_2 s_2, \ldots, P_{N_T} s_{N_T}]^T \qquad \text{[Equation 3]}$$

In addition, $\hat{s}$ may be represented as Equation 4 using diagonal matrix P of the transmission power.

$$\hat{s} = \begin{bmatrix} P_1 & & & 0 \\ & P_2 & & \\ & & \ddots & \\ 0 & & & P_{N_T} \end{bmatrix} \begin{bmatrix} s_1 \\ s_2 \\ \vdots \\ s_{N_T} \end{bmatrix} = Ps \qquad \text{[Equation 4]}$$

Assuming a case of configuring $N_T$ transmitted signals $x_1, x_2, \ldots, x_{N_T}$, which are actually transmitted, by applying weight matrix W to the information vector $\hat{S}$ having the adjusted transmit powers, the weight matrix W serves to appropriately distribute the transmission information to each antenna according to a transport channel state $x_1, x_2, \ldots, x_{N_T}$ may be expressed by using the vector X as follows.

$$x = \begin{bmatrix} x_1 \\ x_2 \\ \vdots \\ x_i \\ \vdots \\ x_{N_T} \end{bmatrix} = \begin{bmatrix} w_{11} & w_{12} & \cdots & w_{1N_T} \\ w_{21} & w_{22} & \cdots & w_{2N_T} \\ \vdots & & \ddots & \vdots \\ w_{i1} & w_{i2} & \cdots & w_{iN_T} \\ \vdots & & \ddots & \vdots \\ w_{N_T 1} & w_{N_T 2} & \cdots & w_{N_T N_T} \end{bmatrix} \begin{bmatrix} \hat{s}_1 \\ \hat{s}_2 \\ \vdots \\ \hat{s}_j \\ \vdots \\ \hat{s}_{N_T} \end{bmatrix} = W\hat{s} = WPs$$

[Equation 5]

In Equation 5, $w_{ij}$ denotes a weight between an $i^{th}$ Tx antenna and $j^{th}$ information. W is also called a precoding matrix.

If the $N_R$ Rx antennas are present, respective received signals $y_1, y_2, \ldots, y_{N_R}$ of the antennas may be expressed as follows.

$$y = [y_1, y_2, \ldots, y_{N_R}]^T \qquad \text{[Equation 6]}$$

If channels are modeled in the MIMO wireless communication system, the channels may be distinguished according to Tx/Rx antenna indexes. A channel from the Tx antenna j to the Rx antenna i is denoted by $h_{ij}$. In $h_{ij}$, it is noted that the indexes of the Rx antennas precede the indexes of the Tx antennas in view of the order of indexes.

FIG. 5(b) is a diagram illustrating channels from the $N_T$ Tx antennas to the Rx antenna i. The channels may be combined and expressed in the form of a vector and a matrix. In FIG. 5(b), the channels from the $N_T$ Tx antennas to the Rx antenna i may be expressed as follows.

$$h_i^T = [h_{i1}, h_{i2}, \ldots, h_{iN_T}] \qquad \text{[Equation 7]}$$

Accordingly, all channels from the $N_T$ Tx antennas to the $N_R$ Rx antennas may be expressed as follows.

$$H = \begin{bmatrix} h_1^T \\ h_2^T \\ \vdots \\ h_i^T \\ \vdots \\ h_{N_R}^T \end{bmatrix} = \begin{bmatrix} h_{11} & h_{12} & \cdots & h_{1N_T} \\ h_{21} & h_{22} & \cdots & h_{2N_T} \\ \vdots & & \ddots & \\ h_{i1} & h_{i2} & \cdots & h_{iN_T} \\ \vdots & & \ddots & \\ h_{N_R 1} & h_{N_R 2} & \cdots & h_{N_R N_T} \end{bmatrix}$$

[Equation 8]

An AWGN (Additive White Gaussian Noise) is added to the actual channels after a channel matrix H. The AWGN $n_1, n_2, \ldots, n_{N_R}$ respectively added to the $N_R$ Rx antennas may be expressed as follows.

$$n = [n_1, n_2, \ldots, n_{N_R}]^T \qquad \text{[Equation 9]}$$

Through the above-described mathematical modeling, the received signals may be expressed as follows.

$$y = \begin{bmatrix} y_1 \\ y_2 \\ \vdots \\ y_i \\ \vdots \\ y_{N_R} \end{bmatrix} = \begin{bmatrix} h_{11} & h_{12} & \cdots & h_{1N_T} \\ h_{21} & h_{22} & \cdots & h_{2N_T} \\ \vdots & & \ddots & \\ h_{i1} & h_{i2} & \cdots & h_{iN_T} \\ \vdots & & \ddots & \\ h_{N_R 1} & h_{N_R 2} & \cdots & h_{N_R N_T} \end{bmatrix} \begin{bmatrix} x_1 \\ x_2 \\ \vdots \\ x_j \\ \vdots \\ x_{N_T} \end{bmatrix} + \begin{bmatrix} n_1 \\ n_2 \\ \vdots \\ n_i \\ \vdots \\ n_{N_R} \end{bmatrix} =$$

[Equation 10]

$$Hx + n$$

Meanwhile, the number of rows and columns of the channel matrix H indicating the channel state is determined by the number of Tx and Rx antennas. The number of rows of the channel matrix H is equal to the number $N_R$ of Rx antennas and the number of columns thereof is equal to the number $N_T$ of Tx antennas. That is, the channel matrix H is an $N_R \times N_T$ matrix.

The rank of the matrix is defined by the smaller of the number of rows and the number of columns, which are independent from each other. Accordingly, the rank of the matrix is not greater than the number of rows or columns. The rank rank(H) of the channel matrix H is restricted as follows.

$$\text{rank}(H) \leq \min(N_T, N_R) \qquad \text{[Equation 11]}$$

Additionally, the rank of a matrix may also be defined as the number of non-zero Eigen values when the matrix is Eigen-value-decomposed. Similarly, the rank of a matrix may be defined as the number of non-zero singular values when the matrix is singular-value-decomposed. Accordingly, the physical meaning of the rank of a channel matrix may be the maximum number of channels through which different pieces of information may be transmitted.

In the description of the present document, 'rank' for MIMO transmission indicates the number of paths capable of sending signals independently on specific time and frequency resources and 'number of layers' indicates the number of signal streams transmitted through the respective paths. Generally, since a transmitting end transmits the number of layers corresponding to the rank number, one rank has the same meaning of the layer number unless mentioned specially.

Synchronization Acquisition of D2D UE

Now, a description will be given of synchronization acquisition between UEs in D2D communication based on the foregoing description in the context of the legacy LTE/LTE-A system. In an OFDM system, if time/frequency synchronization is not acquired, the resulting inter-cell interference (ICI) may make it impossible to multiplex different UEs in an OFDM signal. If each individual D2D UE acquires synchronization by transmitting and receiving a synchronization signal directly, this is inefficient. In a distributed node system such as a D2D communication system, therefore, a specific node may transmit a representative synchronization signal and the other UEs may acquire synchronization using the representative synchronization signal. In other words, some nodes (which may be an eNB, a UE, and a synchronization reference node (SRN, also referred to as a synchronization source)) may transmit a D2D synchronization signal (D2DSS) and the remaining UEs may transmit and receive signals in synchronization with the D2DSS.

Figure 6:
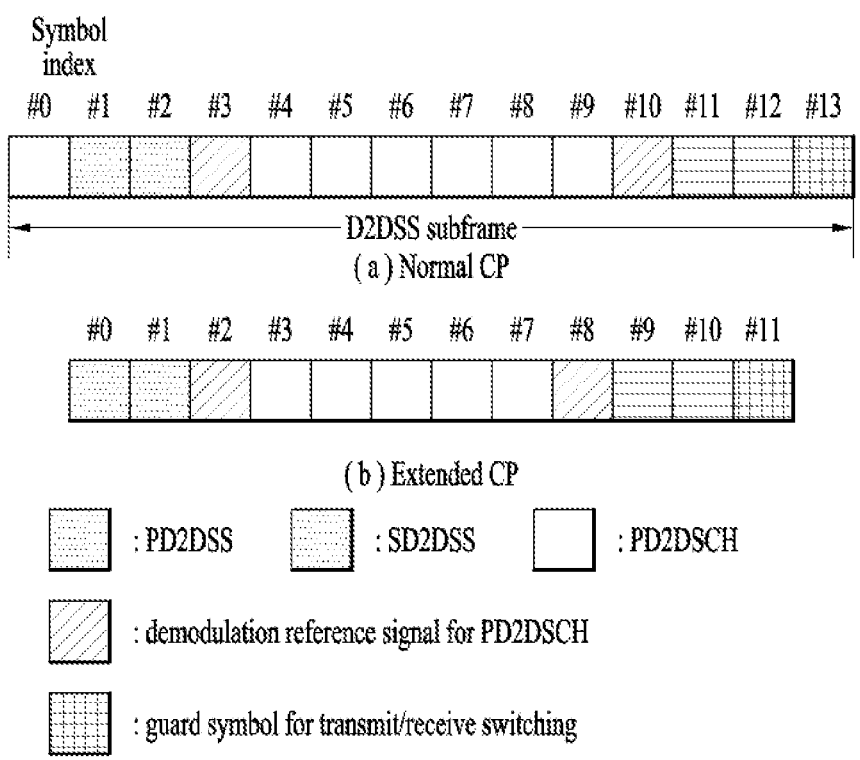
FIG. 6 is a view illustrating a subframe carrying a device-to-device (D2D) synchronization signal.

D2DSSs may include a primary D2DSS (PD2DSS) or a primary sidelink synchronization signal (PSSS) and a secondary D2DSS (SD2DSS) or a secondary sidelink synchronization signal (SSSS). The PD2DSS may be configured to have a similar/modified/repeated structure of a Zadoff-chu sequence of a predetermined length or a primary synchronization signal (PSS). Unlike a DL PSS, the PD2DSS may use a different Zadoff-chu root index (e.g., 26, 37). And, the SD2DSS may be configured to have a similar/modified/repeated structure of an M-sequence or a secondary synchronization signal (SSS). If UEs synchronize their timing with an eNB, the eNB serves as an SRN and the D2DSS is a PSS/SSS. Unlike PSS/SSS of DL, the PD2DSS/SD2DSS follows UL subcarrier mapping scheme. FIG. 6 shows a subframe in which a D2D synchronization signal is transmitted. A physical D2D synchronization channel (PD2DSCH) may be a (broadcast) channel carrying basic (system) information that a UE should first obtain before D2D signal transmission and reception (e.g., D2DSS-related information, a duplex mode (DM), a TDD UL/DL configuration, a resource pool-related information, the type of an application related to the D2DSS, etc.). The PD2DSCH may be transmitted in the same subframe as the D2DSS or in a subframe subsequent to the frame carrying the D2DSS. A DMRS may be used to demodulate the PD2DSCH.

The SRN may be a node that transmits a D2DSS and a PD2DSCH. The D2DSS may be a specific sequence and the PD2DSCH may be a sequence representing specific information or a codeword produced by predetermined channel coding. The SRN may be an eNB or a specific D2D UE. In the case of partial network coverage or out of network coverage, the SRN may be a UE.

Figure 7:
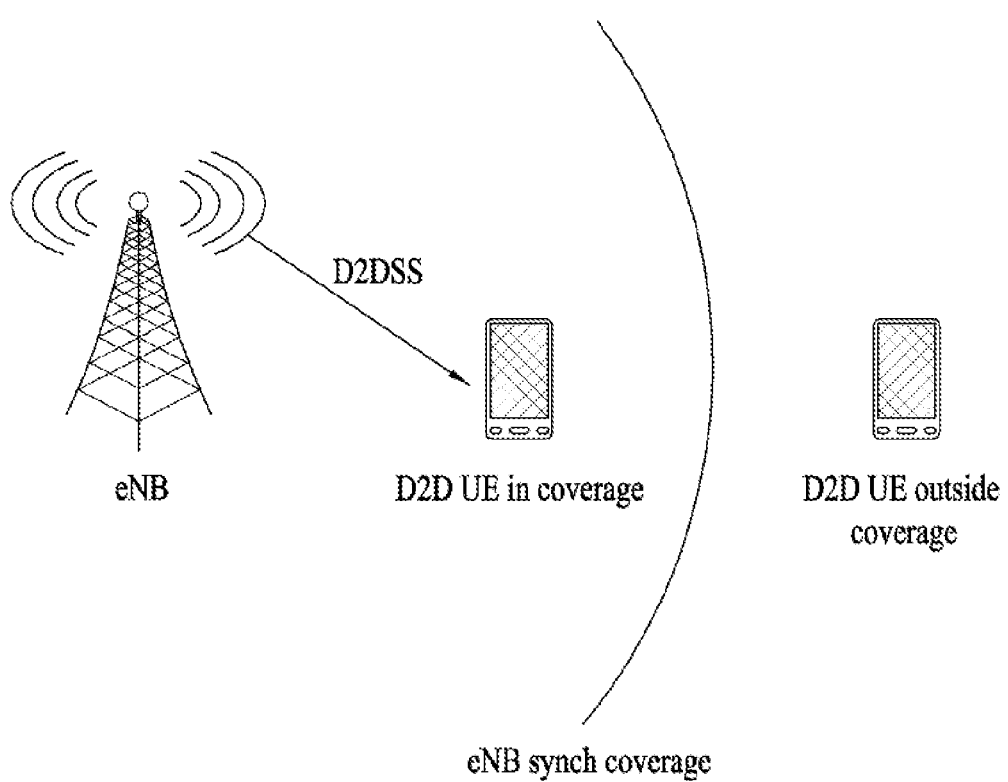
FIG. 7 is a view illustrating relay of a D2D signal.

In a situation illustrated in FIG. 7, a D2DSS may be relayed for D2D communication with an out-of-coverage UE. The D2DSS may be relayed over multiple hops. The following description is given with the appreciation that relay of an SS covers transmission of a D2DSS in a separate format according to a SS reception time as well as direct amplify-and-forward (AF)-relay of an SS transmitted by an eNB. As the D2DSS is relayed, an in-coverage UE may communicate directly with an out-of-coverage UE.

D2D Resource Pool

Figure 8:
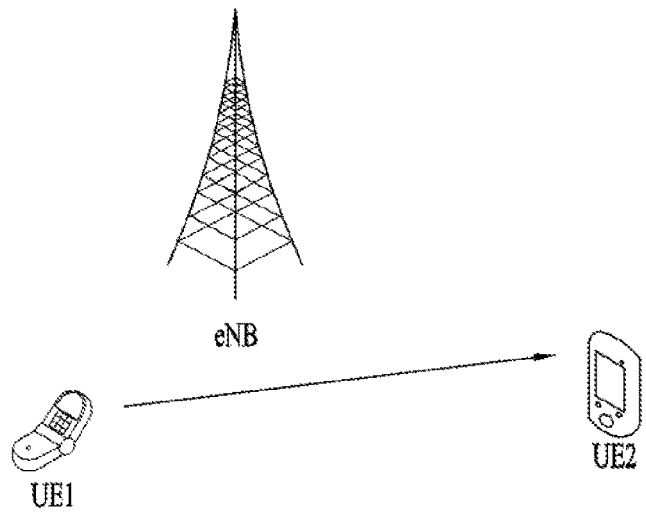
FIG. 8 is a view illustrating an exemplary D2D resource pool for D2D communication.
Figure 8:
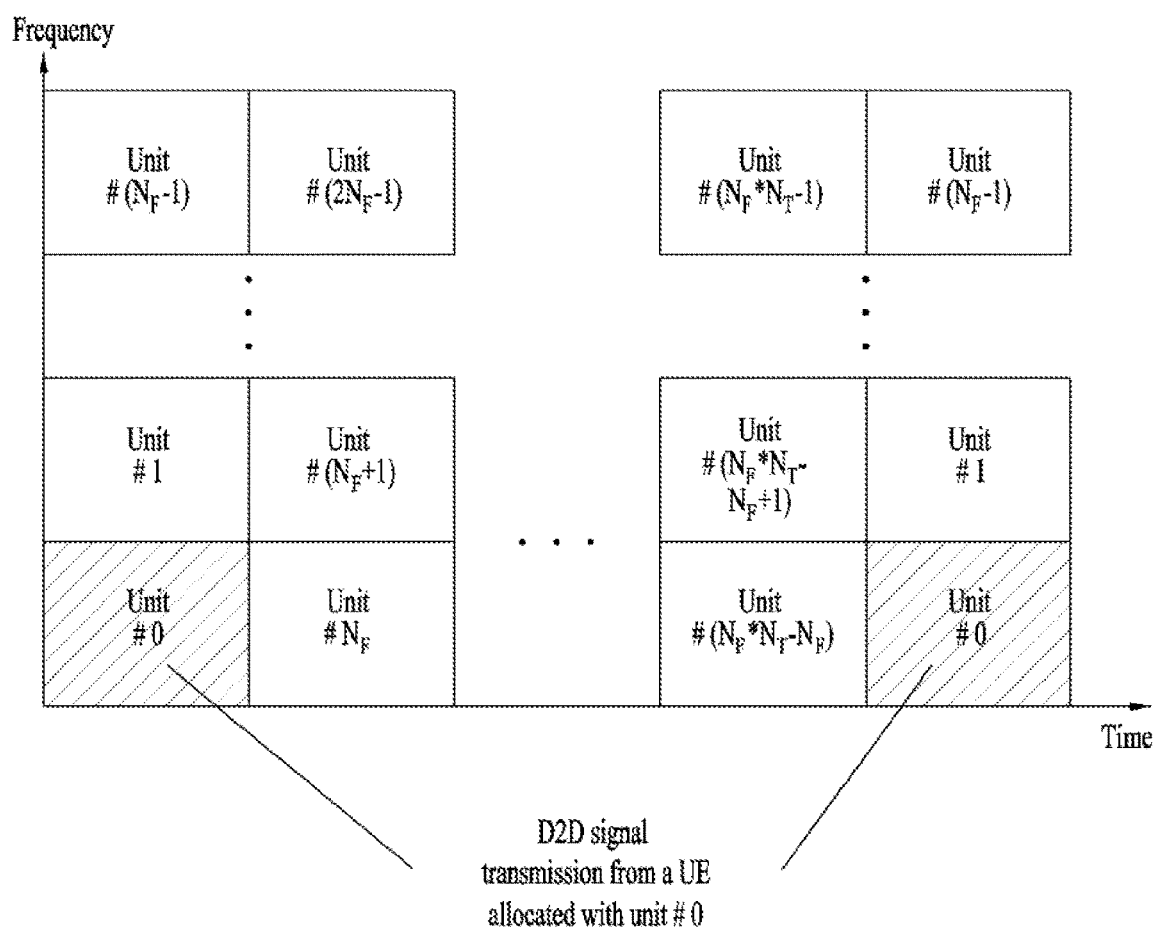

FIG. 8 shows an example of a first UE (UE1), a second UE (UE2) and a resource pool used by UE1 and UE2 performing D2D communication. In FIG. 8(*a*), a UE corresponds to a terminal or such a network device as an eNB transmitting and receiving a signal according to a D2D communication scheme. A UE selects a resource unit corresponding to a specific resource from a resource pool corresponding to a set of resources and the UE transmits a D2D signal using the selected resource unit. UE2 corresponding to a receiving UE receives a configuration of a resource pool in which UE1 is able to transmit a signal and detects a signal of UE1 in the resource pool. In this case, if UE1 is located at the inside of coverage of an eNB, the eNB may inform UE1 of the resource pool. If UE1 is located at the outside of coverage of the eNB, the resource pool may be informed by a different UE or may be determined by a predetermined resource. In general, a resource pool includes a plurality of resource units. A UE selects one or more resource units from among a plurality of the resource units and may be able to use the selected resource unit(s) for D2D signal transmission. FIG. 8(*b*) shows an example of configuring a resource unit. Referring to FIG. 8(*b*), the entire frequency resources are divided into the $N_F$ number of resource units and the entire time resources are divided into the $N_T$ number of resource units. In particular, it is able to define $N_F*N_T$ number of resource units in total. In particular, a resource pool may be repeated with a period of $N_T$ subframes. Specifically, as shown in FIG. 8, one resource unit may periodically and repeatedly appear. Or, an index of a physical resource unit to which a logical resource unit is mapped may change with a predetermined pattern according to time to obtain a diversity gain in time domain and/or frequency domain. In this resource unit structure, a resource pool may correspond to a set of resource units capable of being used by a UE intending to transmit a D2D signal.

A resource pool may be classified into various types. First of all, the resource pool may be classified according to contents of a D2D signal transmitted via each resource pool. For example, the contents of the D2D signal may be classified into various signals and a separate resource pool may be configured according to each of the contents. The contents of the D2D signal may include a scheduling assignment (SA or physical sidelink control channel (PSCCH)), a D2D data channel, and a discovery channel. The SA may correspond to a signal including information on a resource position of a D2D data channel, information on a modulation and coding scheme (MCS) necessary for modulating and demodulating a data channel, information on a MIMO transmission scheme, information on a timing advance (TA), and the like. The SA signal may be transmitted on an identical resource unit in a manner of being multiplexed with D2D data. In this case, an SA resource pool may correspond to a pool of resources that an SA and D2D data are transmitted in a manner of being multiplexed. The SA signal may also be referred to as a D2D control channel or a physical sidelink control channel (PSCCH). The D2D data channel (or, physical sidelink shared channel (PSSCH)) corresponds to a resource pool used by a transmitting UE to transmit user data. If an SA and a D2D data are transmitted in a manner of being multiplexed in an identical resource unit, D2D data channel except SA information may be transmitted only in a resource pool for the D2D data channel. In other word, REs, which are used to transmit SA information in a specific resource unit of an SA resource pool, may also be used for transmitting D2D data in a D2D data channel resource pool. The discovery channel may correspond to a resource pool for a message that enables a neighboring UE to discover transmitting UE transmitting information such as ID of the UE, and the like.

Although contents of D2D signal are identical to each other, it may use a different resource pool according to a transmission/reception attribute of the D2D signal. For example, in case of the same D2D data channel or the same discovery message, the D2D data channel or the discovery signal may be classified into a different resource pool according to a transmission timing determination scheme (e.g., whether a D2D signal is transmitted at the time of receiving a synchronization reference signal or the timing to which a prescribed timing advance is added) of a D2D signal, a resource allocation scheme (e.g., whether a transmission resource of an individual signal is designated by an eNB or an individual transmitting UE selects an individual signal transmission resource from a pool), a signal format (e.g., number of symbols occupied by a D2D signal in a subframe, number of subframes used for transmitting a D2D signal), signal strength from an eNB, strength of transmit power of a D2D UE, and the like. For clarity, a method for an eNB to directly designate a transmission resource of a D2D transmitting UE is referred to as a mode 1 (mode 3 in case of V2X). If a transmission resource region is configured in advance or an eNB designates the transmission resource region and a UE directly selects a transmission resource from the transmission resource region, it is referred to as a mode 2 (mode 4 in case of V2X). In case of performing D2D discovery, if an eNB directly indicates a resource, it is referred to as a type 2. If a UE directly selects a transmission resource from a predetermined resource region or a resource region indicated by the eNB, it is referred to as type 1.

Figure 9:
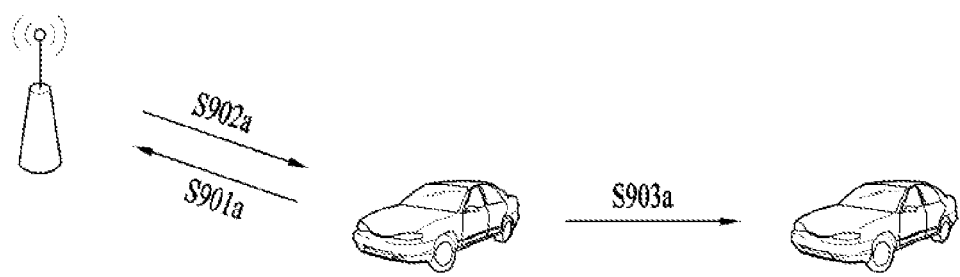
FIG. 9 is a view referred to for describing transmission modes and scheduling schemes for vehicle-to-everything (V2X)
Figure 9:
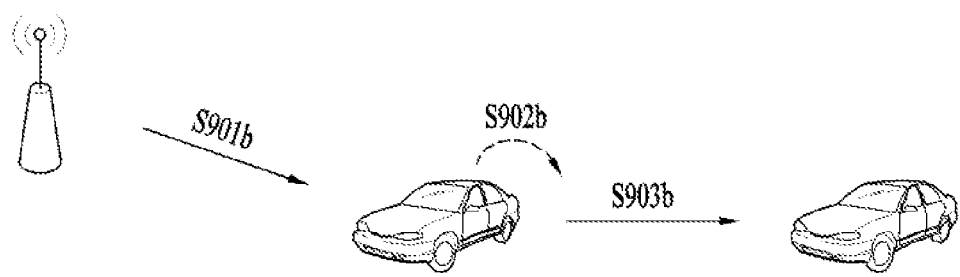
Figure 10:
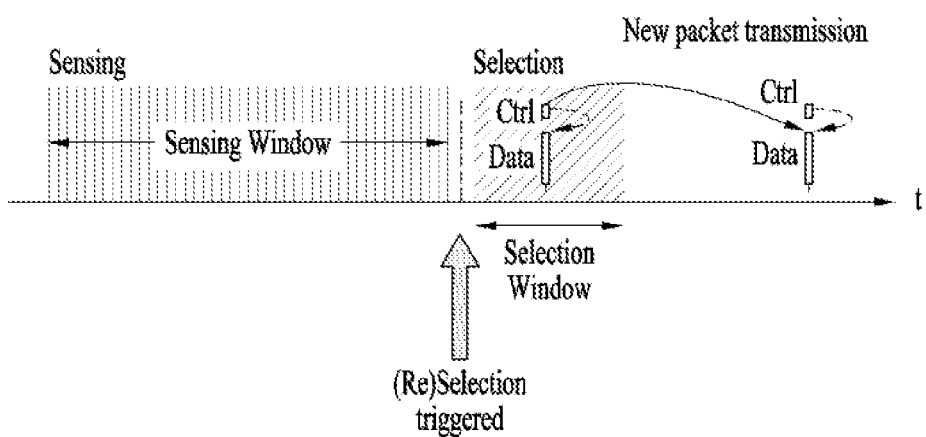
FIG. 10 is a view illustrating a method of selecting resources in V2X.
Figure 11:
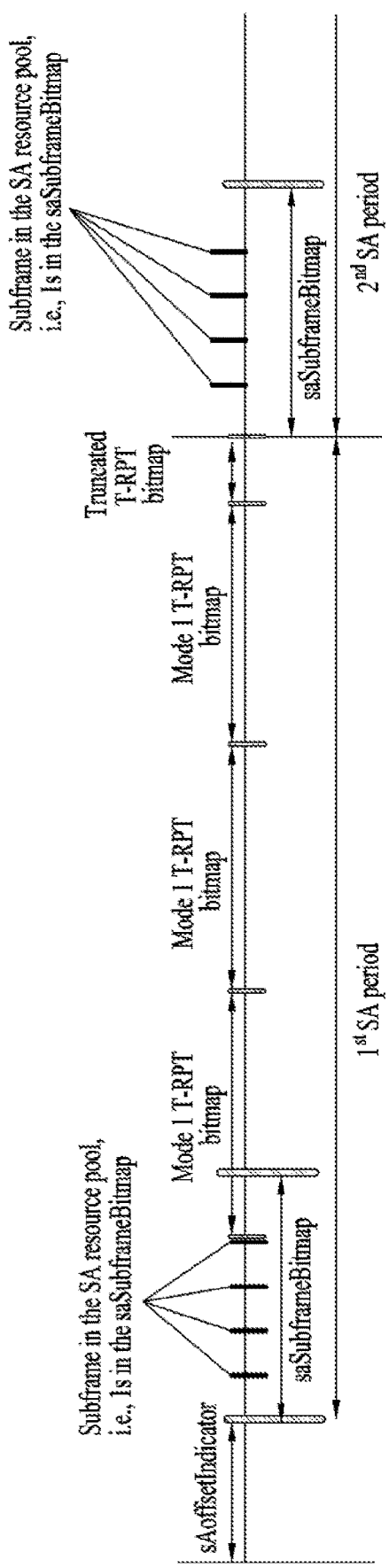
FIG. 11 is a view referred to for describing a scheduling assignment (SA) and data transmission in D2D.

In V2X, sidelink transmission mode 3 based on centralized scheduling and sidelink transmission mode 4 based on distributed scheduling are available. FIG. 9 illustrates scheduling schemes according to these two transmission modes. Referring to FIG. 9, in transmission mode 3 based on centralized scheduling, when a vehicle requests sidelink resources to an eNB (S901a), the eNB allocates the resources (S902a), and the vehicle transmits a signal in the resources to another vehicle (S903a). In the centralized transmission scheme, resources of another carrier may be also scheduled. In distributed scheduling corresponding to transmission mode 4 illustrated in FIG. 9(b), a vehicle selects transmission resources (S902b), while sensing resources preconfigured by the eNB, that is, a resource pool (S901b), and then transmits a signal in the selected resources to another vehicle (S903b). When the transmission resources are selected, transmission resources for a next packet are also reserved, as illustrated in FIG. 10. In V2X, each medium access control (MAC) protocol data unit (PDU) is transmitted twice. When resources for an initial transmission are reserved, resources for a retransmission are also reserved with a time gap from the resources for the initial transmission. For details of the resource reservation, see Section 14 of 3GPP TS 36.213 V14.6.0, which is incorporated herein as background art.

Transmission and Reception of SA

A UE in sidelink transmission mode 1 may transmit a scheduling assignment (SA) (a D2D signal or sidelink control information (SCI)) in resources configured by an eNB. A UE in sidelink transmission mode 2 may be configured with resources for D2D transmission by the eNB, select time and frequency resources from among the configured resources, and transmit an SA in the selected time and frequency resources.

In sidelink transmission mode 1 or 2, an SA period may be defined as illustrated in FIG. 9. Referring to FIG. 9, a first SA period may start in a subframe spaced from a specific system frame by a specific offset, SAOffsetIndicator indicated by higher-layer signaling. Each SA period may include an SA resource pool and a subframe pool for D2D data transmission. The SA resource pool may include the first subframe of the SA period to the last of subframes indicated as carrying an SA by a subframe bitmap, saSubframeBitmap. The resource pool for D2D data transmission may include subframes determined by a time-resource pattern for transmission (T-RPT) (or a time-resource pattern (TRP)) in mode 1. As illustrated, when the number of subframes included in the SA period except for the SA resource pool is larger than the number of T-RPT bits, the T-RPT may be applied repeatedly, and the last applied T-RPT may be truncated to include as many bits as the number of the remaining subframes. A transmitting UE performs transmission at T-RPT positions corresponding to is in a T-RPT bitmap, and one MAC PDU is transmitted four times.

Figure 12:
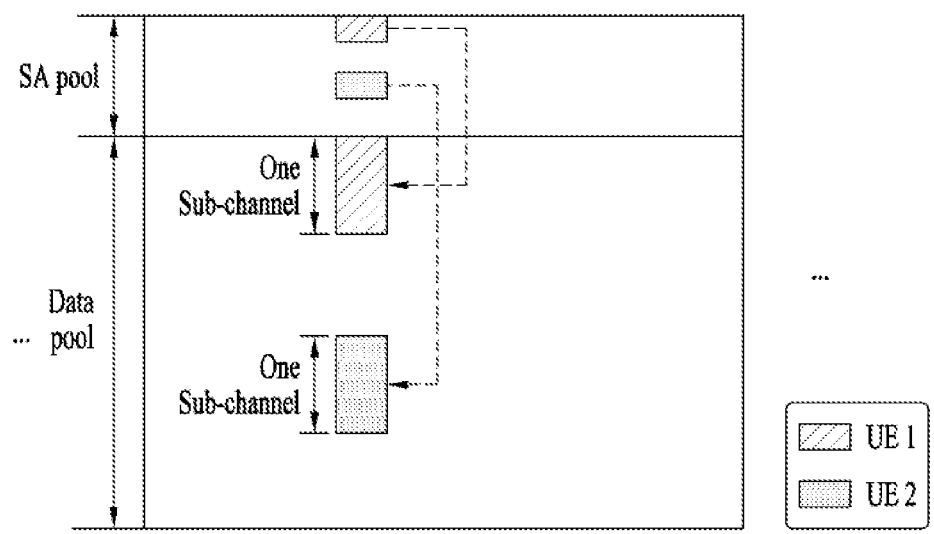
FIG. 12 is a view referred to for describing an SA and data transmission in V2X.
Figure 12:
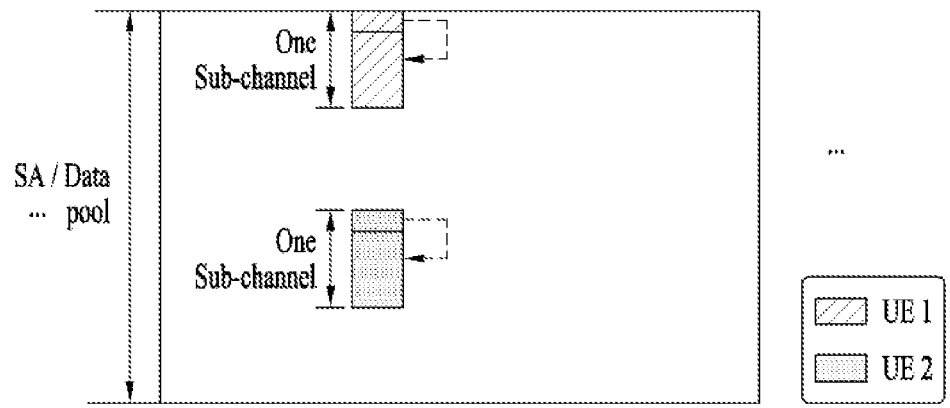

Unlike D2D, an SA (PSCCH) and data (PSSCH) are transmitted in FDM in V2X, that is, sidelink transmission mode 3 or 4. Because latency reduction is a significant factor in V2X in view of the nature of vehicle communication, an SA and data are transmitted in FDM in different frequency resources of the same time resources. Examples of this transmission scheme are illustrated in FIG. 12. An SA and data may not be contiguous to each other as illustrated in FIG. 12(a) or may be contiguous to each other as illustrated in FIG. 12(b). Herein, a basic transmission unit is a subchannel. A subchannel is a resource unit including one or more RBs on the frequency axis in predetermined time resources (e.g., a subframe). The number of RBs included in a subchannel, that is, the size of the subchannel and the starting position of the subchannel on the frequency axis are indicated by higher-layer signaling.

In V2V communication, a cooperative awareness message (CAM) of a periodic message type, a decentralized environmental notification message (DENM) of an event triggered message type, and so on may be transmitted. The CAM may deliver basic vehicle information including dynamic state information about a vehicle, such as a direction and a speed, static data of the vehicle, such as dimensions, an ambient illumination state, details of a path, and so on. The CAM may be 50 bytes to 300 bytes in length. The CAM is broadcast, and its latency should be shorter than 100 ms. The DENM may be generated, upon occurrence of an unexpected incident such as breakdown or an accident of a vehicle. The DENM may be shorter than 3,000 bytes, and received by all vehicles within a transmission range. The DENM may have a higher priority than the CAM. When it is said that a message has a higher priority, this may mean that from the perspective of one UE, in the case of simultaneous transmission of messages, the higher-priority message is transmitted above all things, or earlier in time than any other of the plurality of messages. From the perspective of multiple UEs, a message having a higher priority may be subjected to less interference than a message having a lower priority, to thereby have a reduced reception error probability. Regarding the CAM, the CAM may have a larger message size when it includes security overhead than when it does not.

New Radio Access Technology (New RAT or NR)

As more and more communication devices require a larger communication capacity, there is a need for enhanced mobile broadband communication beyond legacy RAT. In addition, massive Machine Type Communications (MTC) capable of providing a variety of services anywhere and anytime by connecting multiple devices and objects is another important issue to be considered for next generation communications. Communication system design considering services/UEs sensitive to reliability and latency is also under discussion. As such, introduction of new radio access technology considering enhanced mobile broadband communication (eMBB), massive MTC, and ultra-reliable and low latency communication (URLLC) is being discussed. In the present disclosure, for simplicity, this technology will be referred to as NR.

Figure 13:
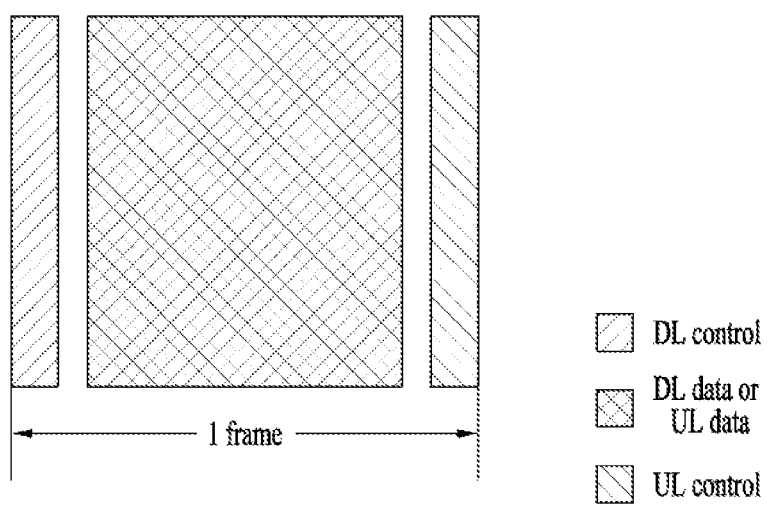
FIG. 13 is a view illustrating an exemplary frame structure in new radio access technology (NRAT)
Figure 14:
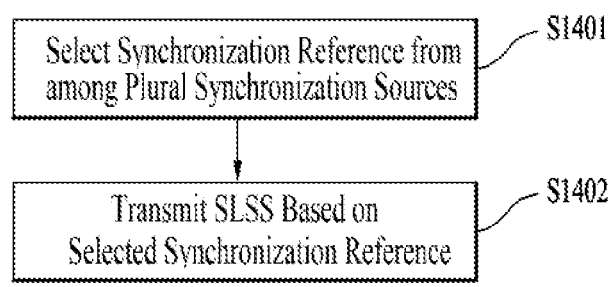
FIG. 14 is a flowchart illustrating a method of transmitting a synchronization signal according to an embodiment of the present disclosure.

FIGS. 13 and 14 illustrate an exemplary frame structure available for NR. Referring to FIG. 13, the frame structure is characterized by a self-contained structure in which all of a DL control channel, DL or UL data, and a UL control channel are included in one frame. The DL control channel may deliver DL data scheduling information, UL data scheduling information, and so on, and the UL control channel may deliver ACK/NACK information for DL data, CSI, (modulation and coding scheme (MCS) information, MIMO transmission-related information, and so on), a scheduling request, and so on. A time gap for DL-to-UL or UL-to-DL switching may be defined between a control region and the data region. A part of a DL control channel, DL data, UL data, and a UL control channel may not be configured in one frame. Further, the sequence of channels in one frame may be changed (e.g., DL control/DL data/UL control/UL data, UL control/UL data/DL control/DL data, or the like).

Even in D2D communication, carrier aggregation (CA) may be used to increase a data transmission rate or reliability. For example, a receiving UE may receive signals in aggregated carriers and combine or jointly decode the received signal or transmit decoded signals to a higher layer to perform (soft) combining on the signals transmitted in the different carriers.

EMBODIMENTS

Now, a description will be given of a method of selecting a synchronization reference related to a sidelink synchronization signal (SLSS) and an SLSS transmission/reception method based on the same, when a plurality of component carriers (CCs) are used for sidelink transmission and reception. In the following description, an anchor CC may refer to a earlier from which a subframe boundary may be derived. That is, the anchor CC refers to a synchronization reference carrier (or synchronization anchor carrier) which may serve as a reference for synchronization among a plurality of CCs. Frequency synchronization as well as timing synchronization may be derived from the anchor CC. Frequency synchronization may also be derived from a sidelink signal received in an individual carrier. In the following description, a synchronization source is a device serving as a reference with which sidelink UEs acquire synchronization, such as a global navigation satellite system (GNSS), an eNB/gNB, or a UE. While the following description is given in the context of a plurality of CCs, the CCs may be interpreted as cells, nodes, or the like. That is, the following description may also be applied when there are a plurality of cells and the cells differ in priority.

Referring to FIG. 14, a UE according to an embodiment of the present disclosure may select a synchronization reference from among a plurality of synchronization sources (S1401), and transmit an SLSS based on the selected synchronization reference (S1402). The sync reference may be selected from among (all) synchronization sources in two or more CCs. That is, the UE selects, as its synchronization reference, a synchronization source having the highest priority from among the synchronization sources monitored in the respective CCs. In other words, when a plurality of synchronization sources are monitored in two or more CCs, a synchronization reference is determined from among all of the synchronization sources monitored in all of the two or more CCs, not for each individual CC. The UE may align synchronization between the two or more CCs based on the selected synchronization reference. That is, once the UE selects a synchronization source in a specific CC, the UE may align subframe boundaries between the CCs by continuously using the synchronization source in the other CCs.

As mentioned earlier, priority may be used to select a synchronization reference from among a plurality of synchronization sources. The priority indicates to the UE which synchronization source between the eNB and the GNSS has priority over the other synchronization source, and may be signaled by higher layer signaling. Since the synchronization reference is selected from among (all) synchronization sources in CCs, the synchronization sources should have the same priorities in each CC. To this end, synchronization source priorities and/or the priority between the GNSS and the eNB should be set equal for a specific CC group. For this purpose, the network may signal to the UE which CC group has the same prioritization by physical-layer signaling or higher-layer signaling. This method intends to select a highest-priority synchronization source and thus also commonly apply a highest-priority synchronization timing to other CCs so that a highest-priority synchronization signal is propagated to neighboring UEs.

In summary, when the UE needs to (re)select a synchronization source, the UE monitors the synchronization sources of other CCs as well. When the UE, finds a highest-priority synchronization source in the CCs, the UE selects the synchronization source and aligns subframe boundaries between all CCs by the selected synchronization source. When a synchronization source is selected for each individual CC, different synchronization sources have different timings, resulting in misalignment between the subframe boundaries/slot boundaries of the CCs. During resource selection or transmission power allocation, therefore, the UE may not fully use transmission power or resource selection in some CC may affect a plurality of subframes/slots in another CC, due to misaligned subframe/slot boundaries between different CCs. Accordingly, there is a need for a method of selecting a common synchronization source to align subframe boundaries/slot boundaries between CCs. When different priorities are monitored, a timing with a highest priority may be selected so that the highest-priority timing is also used for other CCs. In short, when subframe boundaries/slot boundaries are aligned between CCs according to the proposed method, the UE's alignment of subframe boundaries/slot boundaries between CCs in CA or during signal transmission and reception in a plurality of CCs is preferable in terms of power efficiency.

When the UE selects a synchronization reference from among one or more CCs and transmits an SLSS by using the synchronization reference as described above, the UE may transmit the SLSS only in a CC in which the synchronization reference has been selected. That is, the UE may transmit the SLSS/PSBCH only in a carrier in which a high-priority synchronization source has been monitored. The selected carrier may be a specific carrier that the UE selects as a synchronization reference carrier from among sidelink synchronization reference carriers configured by the network, when the UE selects the GNSS or the eNB as a synchronization source. Otherwise (when the UE selects neither the eNB nor the GNSS), the selected carrier may be a carrier in which a highest-priority SLSS has been monitored/received/selected among SLSSs transmitted by the UE. As such, transmission power loss may be reduced by transmitting the SLSS only in the CC selected for synchronization source selection and synchronization signal transmission (e.g., a synchronization reference carrier or an anchor carrier). Specifically, when the UE transmits the SLSS/PSBCH simultaneously in different carriers (multiple carriers), the UE should distribute its transmission power to the carriers and apply maximum power reduction (MPR), thereby losing power more than just in the case of power distribution. To prevent this problem, the UE is allowed to transmit the SLSS/PSBCH only in the carrier in which a highest-priority synchronization source is monitored (in a carrier that the UE has selected as a synchronization reference carrier or an anchor carrier), when the UE monitors the SLSS/PSBCH.

In another example, the UE may transmit the SLSS in all CCs related to a plurality of synchronization sources. That is, the UE may transmit the SLSS in all CCs in which the UE monitors the SLSS. In this case, it is possible to solve the problem of not knowing synchronization with each other, which may occur when synchronization reference carriers are different between UEs or when the synchronization carriers of other UEs are not included in the monitoring carriers of a specific UE. Specifically, for example, when a UE, UE A transmits a synchronization signal only in a specific carrier, carrier X and another UE, UE B selects another carrier, carrier Y as a synchronization reference, UE B may not monitor the synchronization signal of UE A in carrier Y, resulting in no knowledge of synchronization between the UEs. This problem may be averted when the UE transmits the SLSS/PSBCH in all of carriers in which the UE monitors the synchronization signal. However, this option is unnecessary when it may be assumed that all UEs are monitoring a synchronization source in a common carrier. This is because irrespective of a carrier in which a specific UE transmits an SLSS/PSBCH, all UEs are monitoring the carrier. In regard to the above two examples related to a synchronization reference carrier and SLSS transmission, the network may configure the UE to transmit the SLSS only in a CC in which the UE has selected a synchronization reference or in all CCs related to a plurality of synchronization sources by higher-layer signaling according to a deployment situation. A specific one of the two examples (transmission of an SLSS/PSBCH only in a selected CC and transmission of an SLSS/PSBCH in all CCs) may be preconfigured for out-of-coverage.

In regard to SLSS transmission in all CCs related to a plurality of synchronization sources, when SLSS/PSBCH resources are configured at different positions in the plurality of carriers, the UE should exclude the synchronization resources of all other aggregated carriers as well as the synchronization resources of a specific carrier from data resources of the specific carrier. When synchronization resources are at the same position in the CCs, the number of synchronization resources excluded from the data resources may be reduced, whereas when synchronization resources are at different positions in the CCs, the number of synchronization resources excluded from the data resources may be increased.

In order to transmit the SLSS/PSBCH in all carriers in which the UE monitors the SLSS/PSBCH or in a plurality of carriers (selected according to LIE implementation), the following operations may be considered.

First, the network configures the same synchronization signal offset (synchronization resource position) for the plurality of carriers, and the UE alternates between the carriers in transmitting the SLSS/PSBCH. Given N carriers, the SLSS/PSBCH is transmitted in the N carriers i) sequentially, ii) in a preset order, or iii) alternately according to UE implementation. In spite of an increased valid SLSS/PSBCH transmission period for each carrier, this method may avoid MPR application caused by simultaneous transmissions in the CCs. To perform this operation, the network may set a shorter SLSS/PSBCH transmission period. This period may be preconfigured by the network or selected autonomously by the UE. Alternatively, this SLSS/PSBCH transmission period may be linked to the number of CCs that the UE has selected for SLSS/PSBCH transmission. For example, when the UE transmits the SLSS/PSBCH in two carriers, the UE may configure synchronization resources in every half of an existing SLSS/PSBCH transmission period. Although an actual SLSS/PSBCH transmission period in a specific carrier is equal to the existing SLSS/PSBCH transmission period, a synchronization resource period in the specific carrier is reduced by half. When the UE needs to transmit the SLSS/PSBCH in N carriers, the network may set the SLSS/PSBCH transmission period to be shorter than the existing SLSS/PSBCH transmission period by N times, and the UE may alternate between the CCs in transmitting the SLSS/PSBCH in the resources. Herein, the SLSS/PSBCH transmission period of each CC may be equal to the existing SLSS/PSBCH transmission period. The network may configure a maximum number of CCs in which the UE transmits the SLSS/PSBCH. Based on this, a synchronization signal period is configured for each CC, and an actual SLSS/PSBCH transmission may occur alternately between the CCs in the resources.

Secondly, the network may purposely configure a different synchronization signal offset for each carrier, and the UE may accordingly transmit the SLSS/PSBCH in a plurality of CCs. This method may increase the half duplex problem that no transmission and reception is performed in other CCs due to SLSS/PSBCH transmissions in the plurality of CCs. Nonetheless, the need for introducing a new SLSS/PSBCH transmission resource period is obviated.

Thirdly, it is proposed that the network sets the same synchronization offset between CCs, and when the UE transmits the SLSS/PSBCH in a plurality of CCs, the UE transmits the SLSS/PSBCH with a longer transmission periodicity in each CC. For example, when the existing SLSS/PSBCH transmission period is 160 ms and the SLSS/PSBCH is transmitted in two CCs, the SLSS/PSBCH is transmitted every 320 ms. Although this method increases the SLSS/PSBCH transmission period in the CCs and thus cause a loss in a sidelink reference signal received power (S-RSRP) measurement value to other UEs, there is no need for applying MPR which might otherwise be caused by simultaneous transmissions, thereby reducing the loss associated with the MPR application. Further, this method is advantageous in that a new synchronization signal transmission period is not introduced and the half duplex problem is the same as before.

Fourthly, it is proposed that the UE always transmits the SLSS/PSBCH at least in a carrier that the UE has selected as a synchronization reference carrier, and transmits the SLSS/PSBCH in other carriers on an occasion or with a changed transmission periodicity. The UE may transmit the SLSS/PSBCH in every synchronization resource in the carrier that the UE has selected as a synchronization reference, and in other carriers with a longer periodicity. This operation allows the UE to transmit the SLSS/PSBCH with a longer periodicity in the other carriers, instead of not transmitting the SLSS/PSBCH at all in the other carriers, so that when other UEs acquire this signal on an occasion, the UEs may monitor the synchronization signal. This method may be generalized such that different SLSS/PSBCH transmission periods are configured between a carrier that the UE has selected as a synchronization reference carrier and the other carriers, and the SLSS/PSBCH transmission period of each CC is preconfigured or signaled by the network.

When a PSCCH/PSSCH is transmitted in a carrier other than an anchor carrier, the UE may perform the following operation. A method of excluding X subframes before an SLSS/PSBCH transmission from a PSCCH/PSSCH transmission to transmit the synchronization signal (SLSS/PSBCH) is proposed. This is because transmission and/or reception may be impossible when a transmission chain should be retuned for the SLSS/PSBCH transmission. X may be predetermined according to a UE capability or (pre)configured by the network. Because the period of resources excluded for the SLSS/PSBCH transmission is equal to the SLSS/PSBCH transmission period (e.g., 160 ms), it is proposed that resources are excluded for a new reservation period (i.e., the SLSS/PSBCH transmission period) during sensing.

The network may configure a plurality of anchor carriers, and the UE may select a highest-priority synchronization source from among the anchor carriers. When the same priority is monitored in each carrier, S-RSRPs may be measured in the carriers and a synchronization source and carrier with largest S-RSRP measurements may be selected.

An anchor carrier may refer to a carrier in which the SLSS should or may be detected. The UE may select a highest-priority synchronization source, while tracking/searching for the SLSS in CCs indicated for SLSS detection.

Whether the UE actually transmits the SLSS/PSBCH in a specific CC of which the timing has been derived from the anchor carrier may be related to whether the UE transmits the PSCCH/PSSCH. For example, the SLSS/PSBCH transmission in the specific CC may be limited to a case in which the network allows the SLSS/PSBCH transmission in the CC and/or the UE transmits the PSSCH/PSCCH in the CC. When the UE transmits the PSSCH/PSCCH by switching between multiple carriers due to a limited transmission chain, the UE may transmit the SLSS/PSBCH in all carriers in which the UE transmits the PSCCH/PSSCH, only in a high-priority carrier among the carriers, or only in a carrier in which a high-priority synchronization source is monitored.

In another example related to selection of a synchronization reference, a CC in which a synchronization reference should be selected may be predetermined. That is, the subframe boundary of each CC is determined based on a synchronization source monitored in a CC preconfigured for the UE. When any other synchronization signal is not monitored in the determined CC, a synchronization source may be monitored in a lower-priority CC and the subframe/slot boundary of each CC may be determined based on the synchronization source. This may be extended to a method of selecting a synchronization source in a lower-priority CC, when a synchronization source with a priority equal to or higher than a specific priority is not monitored in a specific CC. For this purpose, priorities for selecting a synchronization source in each CC and a minimum priority level of a synchronization source to be monitored in each CC may be predetermined or signaled to the UE through physical-layer signaling or higher-layer signaling by the network. This method is intended to prevent unnecessary timing misalignment in other CCs, caused by following a synchronization source selected in a specific CC in spite of the absence of no high-priority synchronization source in the specific CC. When a high-priority synchronization source is detected in another CC, not in the specific CC, the synchronization source of the other CC is selected.

In another example, a method is proposed independently or in conjunction with the above method, in which when a UE simultaneously monitors the synchronization source of an LTE Rel.15 (Rel. 15) UE and the synchronization source of an LTE Rel.14 (Rel. 14) UE in a specific CC or different CCs and/or the synchronization priorities of the two UEs are identical, the UE first selects the synchronization source of the Rel.14 UE. For this purpose, the PSBCH may include an indicator indicating Rel.14 or Rel.15 (or an indicator indicating a Rel.15 UE only to the Rel.15 UE because the Rel.14 UE may not change the field configuration of the PSBCH), and/or different synchronization resources may be configured for the releases. For example, when a Rel.15 UE using the GNSS as a synchronization source is monitored in CC #0 and a Rel.14 UE using the eNB as a synchronization source is monitored in CC #1, the Rel.15 UE may prioritize and hence select the synchronization source of the Rel.14 UE.

When two or more synchronization sources are of the same priority during synchronization reference selection, a synchronization source having a large signal strength may be selected. When the same synchronization source priority is monitored in multiple CCs, the synchronization source of a CC with a large S-RSRP measurement may be selected. Alternatively, the synchronization source of a CC with a low carrier frequency may be selected. The reason for selecting a synchronization source of a low carrier frequency is that a lower carrier frequency is propagated farther. In this case, a corresponding synchronization cluster may include more UEs. Alternatively, when the same synchronization source priority is monitored, the priority of each CC may be preconfigured or indicated by the network. Alternatively, an S-RSRP offset exists for each CC (indicated by the network or preconfigured) and the UE may apply offsets to S-RSRP measurements and then finally select a CC. Alternatively, when the same synchronization source priority is monitored in different CCs, the UE may make a final selection randomly or depending on UE implementation. By extending this operation, it may be regulated that even when synchronization sources have different priorities, the synchronization source of a carrier having a quality measurement (S-RSRP) equal to or larger than a predetermined level and different from the quality measurement of a lower-priority carrier by a predetermined threshold or larger is selected, rather than a synchronization source having a high priority is always selected. Alternatively, the selection order of carriers and the priorities of the carriers may be preset, or a minimum S-RSRP measurement requirement for each carrier/synchronization priority may be preconfigured or indicated by the network.

The CC from which the synchronization reference has been selected may be determined as a synchronization reference CC. Alternatively, from the viewpoint of a Rel. 15 UE, a carrier in which a Rel. 14 UE operates may be considered to be a synchronization anchor carrier, and this anchor carrier may be configured as the carrier in which the rel. 14 UE operates. In the absence of a Rel.14 UE in the other carriers, the Rel. 15 UE has only to transmit and receive a synchronization signal only in the anchor carrier. For this purpose, the network may configure a carrier expected to have a Rel.14 UE as a synchronization anchor carrier.

When an anchor carrier is configured and carriers having the same timing as that of the anchor carrier are grouped, the same D2D frame number (DFN) (or sidelink frame number) offset should be configured for each group to thereby finally achieve the same subframe boundary. Accordingly, it is proposed that the network configures the same DFN offset for the carrier groups (this configuration may be signaled individually on a CC basis) or signals only one DFN offset for each carrier group.

Now, a description will be given of a method of configuring a plurality of synchronization anchor carriers, which is performed independently or in conjunction with the foregoing description. This method is intended for i) a case in which a Rel.14 UE supports up to two CCs and there are a plurality of synchronization anchor carriers from the viewpoint of a Rel.15 UE, ii) a case in which the number of synchronization anchor carriers is based on a configuration of the network irrespective of a Rel.14 UE, and iii) a case in which the number of anchor carriers is preset in conjunction with a band combination.

A method of configuring a plurality of synchronization anchor carriers and signaling the configured synchronization anchor carriers to a UE by physical-layer signaling or higher-layer signaling by a network is proposed. The plurality of synchronization anchor carriers may be preconfigured or configured by the application layer of the UE.

The UE may operate a plurality of anchor carriers. The UE may monitor a synchronization signal in the plurality of anchor CCs and select a synchronization source with a high priority from among the synchronization sources of the anchor CCs. Alternatively, the UE may operate the plurality of anchor CCs simultaneously. For example, carriers may be grouped into groups with different timings, an anchor carrier may be configured for each group, and a synchronization source selection operation may be performed separately for each anchor carrier, A different anchor carrier may be configured for each carrier or resource pool. For example, CC #X may be configured as an anchor carrier for a specific carrier group, and CC #Y may be configured as an anchor carrier for another carrier group.

The number of anchor carriers that the UE is capable of configuring may depend on a UE capability. For example, when the UE is configured with a plurality of synchronization signal detectors, the UE may operate a plurality of anchor carriers. However, when the UE is configured with a single synchronization signal detector, the UE may operate a single anchor carrier. The number of anchor carriers or a UE capability of anchor carriers may also be called as, for example, a capability of independently tracking synchronization signals having different timings, a capability of transmitting or receiving an SLSS/PSBCH independently or simultaneously in different CCs, a capability of simultaneously searching for, transmitting, or receiving an SLSS/PSBCH in different CCs, and so on. This UE capability of anchor carriers or the SLSS/PSBCH searching capability, may be given to the UE, apart from a UE capability of CCs that the UE may simultaneously, transmit or receive. This is because the number of data transmission or reception chains, the number of synchronization signal detectors, and the number of synchronization signal transmitters may be configured differently or separately.

When the maximum number of anchor carriers configured by the network does not match the UE capability of anchor carriers, the network may pre-indicate the order of using the anchor carriers. For example, when four anchor carriers are indicated and the UE is capable of tracking up to two asynchronous SLSSs/PSBCHs, the UE may configure anchor carriers in an ascending order of carrier frequencies. Alternatively, the order of anchor carriers may be based on UE implementation. Alternatively, a carrier with a high-priority synchronization source may be configured as an anchor carrier, or when the same priority is monitored in carriers, a carrier with a synchronization source having a high S-RSRP measurement may be configured as an anchor carrier. Alternatively, when the priorities of carriers are pre-configured, SLSS/PSBCH tracking may be performed first in a higher-priority carrier.

That is, the number of anchor carriers that the UE is capable of monitoring among anchor carriers configured by the network may be limited according to a UE capability or UE implementation. The UE may select a synchronization reference carrier by monitoring only a part of the anchor carriers. The anchor carriers that the UE monitors are referred to as an anchor carrier subset. As mentioned earlier, the order of monitoring anchor carriers may be determined by the network and thus the subset may be determined based on the monitoring order, based on carriers in which the UE is simultaneously transmitting or receiving a PSSCH/PSCCH (data/control signal), according to UE implementation, or according to the UE capability of receiving/transmitting the SLSS/PSBCH. The UE may select one synchronization reference carrier (actual anchor carrier) from the anchor carrier subset.

Once the UE selects a synchronization source in a specific CC, the UE should determine which SLSS/PBSCH to transmit in the CC and other CCs. The following methods may be considered.

First, the UE transmits the SLSS/PBSCH only in a CC preconfigured or indicated for SLSS/PBSCH transmission by the network. This method is intended to obviate the need for transmitting the SLSS/PBSCH in a CC in the absence of a Rel.14 UE in the CC.

Alternatively, when the UE selects a synchronization source in a specific CC, the UE transmits a synchronization signal of a lower priority than the selected synchronization source in other CCs. A synchronization signal offset indicator configured for each CC or the selected CC may be used. This method is intended to maintain a legacy operation as much as possible without changing the existing synchronization signal priority. The difference from the legacy operation lies in that a subframe boundary is set based on a synchronization source selected from a CC and the SLSS/PBSCH is transmitted in another CC based on the subframe boundary.

Alternatively, a method of, when a UE selects a synchronization source in a specific CC, transmitting a synchronization signal and PSBCH of the same priority as that of the selected synchronization source in another CC is proposed. For example, when the network configures two synchronization resources and the GNSS is selected as a synchronization source in CC #0, a legacy UE uses SLSS ID 0 and Incoverage indicator=1, and a UE which has selected the legacy UE as a synchronization source uses SLSS ID 0 and Incoverage indicator=0. It is proposed that when this UE transmits a synchronization source in another CC, the UE uses Incoverage indicator=1 instead of Incoverage indicator=0. The UE may use SLSS 1D 0 or a separate ID. The reason for using a separate ID is to eliminate ambiguity with the UE which has directly selected the GNSS as a synchronization source. However, there may be no problem because the IDs are derived from the same timing, and then ID=0 may be used. When an ID other than ID=0 is used, it may be selected by the UE, preconfigured, or configured by the network. For this purpose, a synchronization resource offset indicator should be set differently for each CC. This operation may be selectively applied only to UEs which have selected an SLSS/PSBCH transmitted by a UE as a synchronization resource, not to a top priority. For example, the UE which has directly selected the GNSS as a synchronization source transmits an SLSS/PSBCH which was used when it has selected the GNSS in another CC. Only when a UE selects the SLSS/PSBCH transmitted by the UE which has selected the GNSS as a synchronization source, the UE performs the above operation in transmitting a synchronization signal in another CC, so that Rel.15 UEs prioritize a synchronization source selected from the anchor carrier. This method is intended to naturally connect Rel.14 UEs to the synchronization source of a Rel.15 UE by making a synchronization source selected from a synchronization anchor carrier seem to have a higher priority in another carrier.

Alternatively, the UE may signal a CC from which timing has been derived to a neighboring UE by the PSBCH. In this case, because a Rel.14 UE and a rel.15 UE have different PSBCHs, system frame numbers (SFNs) may be different between synchronization signals. In this context, the network may configure different synchronization resources for the releases. Alternatively, For SFN match, the network may configure a reserved bit of the Rel.14 UE to indicate an anchor carrier.

Among the above-described methods, the method of configuring a different synchronization resource in each CC will be considered again. The network may configure the same synchronization resource in each CC for some reason. Particularly in intraband CA, it may be impossible to perform reception in another subframe due to transmission of a synchronization signal in a specific CC. Then, it is also impossible to perform sensing in a subframe of another CC overlapped with a synchronization subframe in a CC, and thus no transmission may be performed in the subframe. To solve the problem, the network may align synchronization resources between group CCs. In this case, the transmission power of the synchronization signal in each CC may be decreased, leading to reduction of synchronization coverage. To solve the problem, the following method may be considered.

When synchronization resources are aligned between CCs, a method of configuring different synchronization signal/PSBCH transmission power for each CC is proposed. For example, excessive reduction of synchronization coverage in a specific CC is prevented by increasing transmission power in the CC. For example, a higher SLSS/PSBCH transmission power may be configured for a CC or synchronization anchor CC in which a Rel.14 UE is expected to exist. For this purpose, the network may signal to the UE how high SLSS/PSBCH transmission power is to be set for which CC by physical-layer signaling or higher-layer signaling. This information may be represented in the form of an offset. This configuration may be preconfigured.

When the network configures the same synchronization resources between CCs, a receiving UE may (re)select a synchronization source based on the sum/maximum/minimum/average of S-RSRP measurements in the CCs. On the assumption that the same synchronization signal is distributed across multiple CCs, the effect of extending effective synchronization coverage is achieved with the sum of the measurements.

The above description may be used in uplink or downlink, not limited to direct communication between UEs, and a BS or a relay node may also use the proposed methods.

Since examples of the above proposed methods may be included as one of methods of implementing the present disclosure, it is apparent that the examples may be regarded as proposed methods. Further, the foregoing proposed methods may be implemented independently, or some of the methods may be implemented in combination (or merged). Further, it may be regulated that information indicating whether the proposed methods are applied (or information about the rules of the proposed methods) is indicated to a UE by a pre-defined signal (or a physical-layer or higher-layer signal) by an eNB, or is requested to a receiving UE or a transmitting UE by the transmitting UE or the receiving UE.

Apparatus Configurations According to Embodiment of the Present Disclosure

Figure 15:
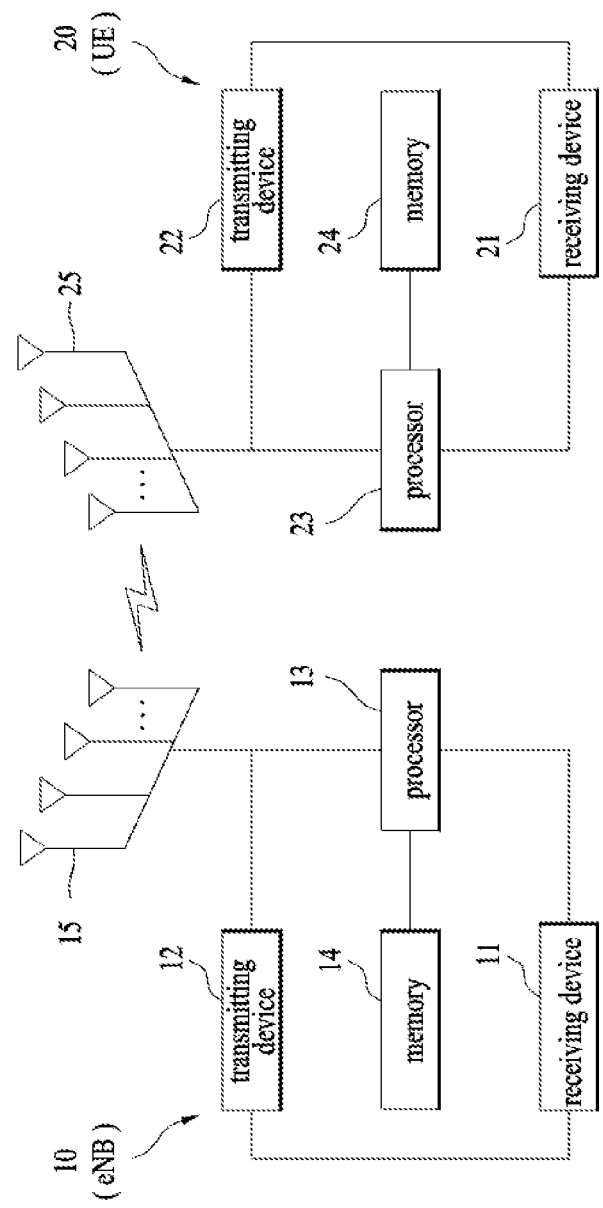
FIG. 15 is a block diagram of a transmission apparatus and a reception apparatus.

FIG. 15 is a block diagram illustrating a transmission point and a UE according to an embodiment of the present disclosure.

Referring to FIG. 15, a transmission point 10 may include a reception device 11, a transmission device 12, a processor 13, a memory 14, and a plurality of antennas 15. Use of the plurality of antennas 15 implies that the transmission point 10 supports MIMO transmission and reception. The reception device 11 may receive various signals, data, and information on uplink from a UE. The transmission device 12 may transmit various signals, data, and information on downlink to a UE. The processor 13 may provide overall control to the transmission point 10. According to an embodiment of the present disclosure, the processor 13 of the transmission point 10 may process requirements of the foregoing embodiments.

Besides, the processor 13 of the transmission point 10 may compute and process information received by the transmission point 10 and information to be transmitted to the outside. The memory 14 may store the computed and processed information for a predetermined time, and may be replaced with a component such as a buffer (not shown).

With reference made again to FIG. 15, a UE 20 may include a reception device 21, a transmission device 22, a processor 23, a memory 24, and a plurality of antennas 25. Use of the plurality of antennas 25 implies that the UE 20 supports MIMO transmission and reception. The reception device 21 may receive various signals, data, and information on downlink from an eNB. The transmission device 22 may transmit various signals, data, and information on uplink to an eNB. The processor 23 may provide overall control to the UE 20.

According to an embodiment of the present disclosure, the processor 23 of the UE 20 may process requirements of the foregoing embodiments. Specifically, the UE selects a synchronization reference from among a plurality of synchronization sources and transmits an SLSS based on the selected synchronization reference through the transmission device. The synchronization reference may be selected from among all synchronization sources in two or more CCs.

Besides, the processor 23 of the UE 20 may compute and process information received by the UE 20 and information to be transmitted to the outside. The memory 24 may store the computed and processed information for a predetermined time, and may be replaced with a component such as a buffer (not shown).

The specific configuration of the transmission point and the UE may be implemented such that the details described in the various embodiments of the present disclosure may be applied independently or implemented such that two or more of the embodiments are applied at the same time. For clarity, a redundant description is omitted.

In the example of FIG. 15, the description of the transmission point 10 may also be applied to a relay as a downlink transmission entity or an uplink reception entity, and the description of the UE 20 may also be applied to a relay as a downlink reception entity or an uplink transmission entity.

The embodiments of the present disclosure may be implemented through various means, for example, in hardware, firmware, software, or a combination thereof.

In a hardware configuration, the methods according to the embodiments of the present disclosure may be achieved by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, etc.

In a firmware or software configuration, the methods according to the embodiments of the present disclosure may be implemented in the form of a module, a procedure, a function, etc. Software code may be stored in a memory unit and executed by a processor. The memory unit is located at the interior or exterior of the processor and may transmit and receive data to and from the processor via various known means.

As described before, a detailed description has been given of preferred embodiments of the present disclosure so that those skilled in the art may implement and perform the present disclosure. While reference has been made above to the preferred embodiments of the present disclosure, those skilled in the art will understand that various modifications and alterations may be made to the present disclosure within the scope of the present disclosure. For example, those skilled in the art may use the components described in the foregoing embodiments in combination. The above embodiments are therefore to be construed in all aspects as illustrative and not restrictive.

Those skilled in the art will appreciate that the present disclosure may be carried out in other specific ways than those set forth herein without departing from the spirit and essential characteristics of the present disclosure. The above embodiments are therefore to be construed in all aspects as illustrative and not restrictive. The scope of the disclosure should be determined by the appended claims and their legal equivalents, not by the above description, and all changes coming within the meaning and equivalency range of the appended claims are intended to be embraced therein. It is obvious to those skilled in the art that claims that are not explicitly cited in each other in the appended claims may be presented in combination as an embodiment of the present disclosure or included as a new claim by a subsequent amendment after the application is filed.

INDUSTRIAL APPLICABILITY

The above-described embodiments of the present disclosure are applicable to various mobile communication systems.

The invention claimed is:

1. A method of transmitting a sidelink synchronization signal (SLSS) in a wireless communication system, the method comprising:
    selecting, by a user equipment (UE), a synchronization carrier and a synchronization reference source; and
    transmitting, by the UE, an SLSS,
    wherein the synchronization carrier is selected based on a highest synchronization reference source priority.

2. The method according to claim 1, wherein the synchronization reference source is on the synchronization carrier.

3. The method according to claim 1, wherein the UE transmits the SLSS only in a synchronization carrier from which the synchronization reference is selected.

4. The method according to claim 1, wherein the UE transmits the SLSS in all component carriers (CCs) related to the plurality of synchronization sources.

5. The method according to claim 1, wherein the UE transmits the SLSS in all CCs in which an SLSS is monitored.

6. The method according to claim 1, wherein whether the UE is to transmit the SLSS only in the CC in which the synchronization reference is selected or in all CCs related to the plurality of synchronization sources is configured by higher-layer signaling.

7. The method according to claim 1, wherein the UE aligns synchronization between the two or more CCs based on the selected synchronization reference.

8. The method according to claim 1, wherein the UE is capable of communicating with at least one of another UE, a UE related to an autonomous driving vehicle, the BS or a network.

9. The method according to claim 1, wherein when two or more synchronization sources have the same priority, a synchronization source having a large signal strength is selected during the selection of the synchronization reference.

10. The method according to claim 1, wherein a CC in which the SLSS is to be transmitted is indicated by higher-layer signaling.

11. The method according to claim 1, wherein when the SLSS is transmitted in the two or more CCs, the SLSS is transmitted sequentially in the respective CCs.

12. The method according to claim 1, wherein when the SLSS is transmitted in the two or more CCs, a transmission period of the SLSS is longer than when the SLSS is transmitted in one CC.

13. The method according to claim 1, wherein the plurality of synchronization sources include a global navigation satellite system (GNSS) and an evolved Node B (eNB).

14. A user equipment (UE) for transmitting a sidelink synchronization signal (SLSS) in a wireless communication system, the UE comprising:
    a transmitter and receiver; and
    a processor,
    wherein the processor is configured to select a synchronization carrier and a synchronization reference source, and transmit an SLSS, and
    wherein the synchronization carrier is selected based on a highest synchronization reference source priority.

* * * * *